United States Patent
Xing et al.

(10) Patent No.: US 11,781,428 B1
(45) Date of Patent: Oct. 10, 2023

(54) PERMEABILITY EVALUATION METHOD FOR HYDRATE-BEARING SEDIMENT

(71) Applicant: CHINA UNIVERSITY OF PETROLEUM (EAST CHINA), Qingdao (CN)

(72) Inventors: Lanchang Xing, Qingdao (CN); Shuo Wang, Qingdao (CN); Huanhuan Zhang, Qingdao (CN); Bin Wang, Qingdao (CN); Zhoutuo Wei, Qingdao (CN); Xinmin Ge, Qingdao (CN); Shaogui Deng, Qingdao (CN)

(73) Assignee: CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 0 days.

(21) Appl. No.: 18/120,919

(22) Filed: Mar. 13, 2023

Related U.S. Application Data

(63) Continuation of application No. PCT/CN2022/116966, filed on Sep. 5, 2022.

(30) Foreign Application Priority Data

Jul. 26, 2022 (CN) .......................... 202210883799.8
Jul. 26, 2022 (CN) .......................... 202210883800.7

(51) Int. Cl.
    *E21B 49/08*     (2006.01)
    *E21B 41/00*     (2006.01)

(52) U.S. Cl.
    CPC ........ *E21B 49/088* (2013.01); *E21B 49/0875* (2020.05); *E21B 41/0099* (2020.05)

(58) Field of Classification Search
    CPC . E21B 41/0099; E21B 49/0875; E21B 49/088
    See application file for complete search history.

(56) References Cited

U.S. PATENT DOCUMENTS 6,049,209 A     4/2000   Xiao
7,983,846 B2 *   7/2011   Sun ........................ G01N 22/00
                                              702/11

(Continued)

FOREIGN PATENT DOCUMENTS

CN       1570670 A    1/2005
CN    105240003 A    1/2016

(Continued)

OTHER PUBLICATIONS

Wang et al. "Integrated Dielectric Model for Unconsolidated Porous Media Containingn Hydrate," IEEE transations on Geoscience and Remote Sensing, vol. 59, No. 7, Jul. 2021 (Year: 2021).*

(Continued)

*Primary Examiner* — John Fitzgerald
(74) *Attorney, Agent, or Firm* — J.C. PATENTS

(57) ABSTRACT

The present application relates to a permeability evaluation method for hydrate-bearing sediment, including a complex conductivity spectrum obtaining step, a hydrate saturation calculating step based on the spectrum, a formation factor calculating step based on Archie's first law or from the complex conductivity real part, imaginary part and a conductivity of pore water; and a permeability calculating step based on relaxation time, hydrate saturation, hydrate occurrence mode correction factor and formation factor, or based on the polarization amplitude, hydrate saturation, occurrence mode correction factor and formation factor, or based on the CEC, hydrate saturation and occurrence mode correction factor, or based on the pore radius, fractal dimension, hydrate saturation and occurrence mode correction factor. The application allows a large measuring range, low cost and high accuracy, and can accurately obtain the permeability of hydrate-bearing sediment and effectively reflect the micro-pore structure thereof.

11 Claims, 7 Drawing Sheets

(56) References Cited

U.S. PATENT DOCUMENTS

| | | | |
|---|---|---|---|
| 9,422,810 B2* | 8/2016 | Dorovsky | E21B 49/00 |
| 11,061,163 B2* | 7/2021 | Seleznev | G01V 3/26 |
| 11,578,595 B2* | 2/2023 | Thabit | E21B 41/00 |
| 2007/0224692 A1* | 9/2007 | Agar | G01N 27/22 |
| | | | 436/150 |
| 2008/0195320 A1* | 8/2008 | Sun | G01V 3/30 |
| | | | 702/7 |
| 2010/0017136 A1* | 1/2010 | Birchwood | E21B 47/00 |
| | | | 702/9 |
| 2017/0370215 A1* | 12/2017 | Hsu | E21B 47/06 |
| 2018/0348396 A1 | 12/2018 | Hou | |
| 2022/0243572 A1* | 8/2022 | Morris | E21B 43/16 |
| 2022/0316332 A1* | 10/2022 | Thabit | E21B 47/06 |

FOREIGN PATENT DOCUMENTS

| | | | | |
|---|---|---|---|---|
| CN | 109932297 A | | 6/2019 | |
| CN | 110554064 A | * | 12/2019 | G01N 15/088 |
| CN | 113406307 A | | 9/2021 | |
| CN | 114063170 A | | 2/2022 | |
| WO | WO-2019156912 A1 | * | 8/2019 | E21B 43/025 |

OTHER PUBLICATIONS

Jasamai et al. "Effect of Water Saturation on Relative Permeability and Porosity in Hydrate Bearing Sand," IPTC-18662-MS (Year: 2016).*

International Search Report of PCT/CN2022/116966.

"New Progress in Permeability Estimation from Induced Polarization Logging Data", Well Logging Technology, vol. 32, No. 6, Dec. 2008, pp. 508-513.

"Relationship Between Oil-water Relative Permeability and Resistivity of Shaly Rock Based on the Similarity Between Water Flow and Electric Current", Well Logging Technology, vol. 39, No. 05, Oct. 20, 2015, ISSN: 1004-1338.

"Application of Archie formula in the Interpretation of Extra Low Permeability Reservoir After Deformation", Journal of Chongqing University of Technology( Natural Science), vol. 31, No. 10, Oct. 15, 2017, ISSN: 1674-8425.

* cited by examiner

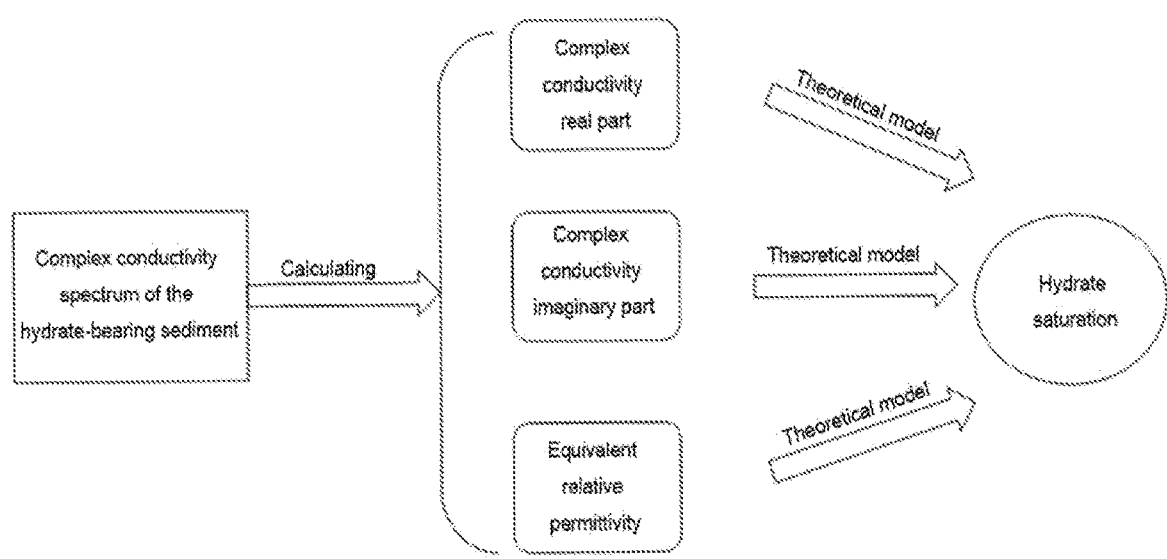
Fig.3
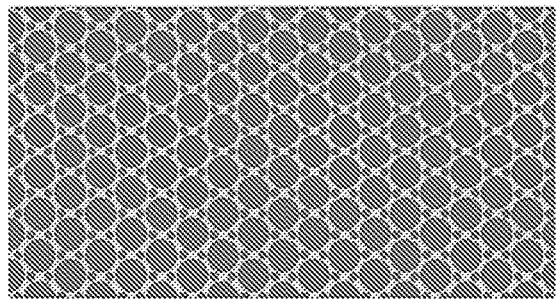 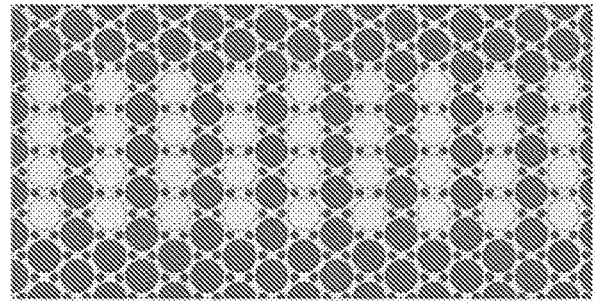
Fig.4A  Fig.4B
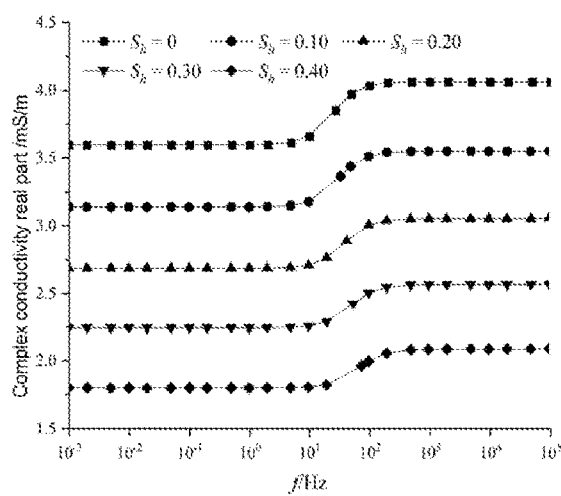 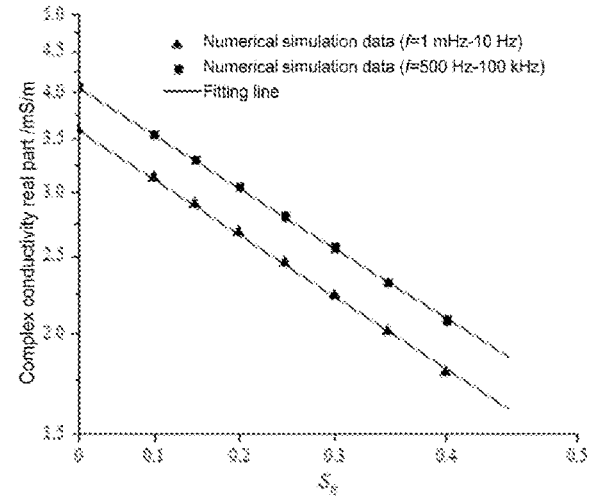
Fig.5A  Fig.5B

PERMEABILITY EVALUATION METHOD FOR HYDRATE-BEARING SEDIMENT

The present application is a continuation of the international application PCT/CN2022/116966 filed on Sep. 5, 2022, which claims the priority of Chinese Patent Application No. 202210883800.7, entitled "Permeability evaluation method for hydrate-bearing sediment samples based on complex conductivity parameters" and filed to the CNIPA on Jul. 26, 2022, and the priority of Chinese Patent Application No. 202210883799.8, entitled "On-site in-situ quantitative permeability evaluation method for hydrate-bearing formation based on complex conductivity" and filed on Jul. 26, 2022. The contents of the above identified applications are incorporated herein by reference in their entirety.

TECHNICAL FIELD

The present application belongs to natural gas hydrate exploration and exploitation technology and particularly relates to a permeability evaluation method for hydrate-bearing sediment.

BACKGROUND OF THE PRESENT INVENTION

Marine natural gas hydrate in China mainly exists in argillaceous and silty sediment, and the permeability of hydrate-bearing sediment varies in a complex and dynamic manner during hydrate decomposition (in exploitation process). On the one hand, it is difficult for laboratories to accurately measure the permeability of the argillaceous and silty sediment which is soft and low in permeability. On the other hand, there is a lack of corresponding data interpretation methods for field well-logging evaluation. The permeability of hydrate-bearing sediment is a very important formation parameter, which is related to the stability of water and gas permeability as well as natural gas production, and is one of key parameters to evaluate the cost-effectiveness of hydrate reservoirs.

Existing permeability evaluation methods for hydrate-bearing sediment have main shortcomings as follows. First, the measurement of permeability is time-consuming and costly. Second, these methods mostly have a small measuring range, which cannot effectively reflect the micro-pore structure of hydrate-bearing sediment and cannot accurately measure the permeability of hydrate-bearing sediment.

SUMMARY OF THE PRESENT INVENTION

To address some of the above problems, a permeability evaluation method for hydrate-bearing sediment is provided in the present application, which is based on complex conductivity, allows a large measuring range and low cost.

The permeability evaluation method for hydrate-bearing sediment includes following steps of:
- a complex conductivity spectrum obtaining step of obtaining complex conductivity spectrum of the hydrate-bearing sediment;
  Specifically, for a hydrate-bearing sediment sample, impedance spectrum measurement is performed on the sample and an electrical impedance spectrum is obtained; using a relationship between electrical impedance and complex resistivity, combining with a length and cross-sectional area of the sample, and based on a definition of complex conductivity, the complex conductivity spectrum is obtained through conversion. For formation hydrate-bearing sediment, based on an induced polarization well-logging method, supplying AC to current electrodes in a well by using ground equipment, the complex conductivity spectrum is obtained by changing frequency f of the AC.
- a hydrate saturation calculating step of calculating hydrate saturation $S_h$ from a frequency spectrum of a complex conductivity real part, from a complex conductivity imaginary part, or from equivalent relative permittivity; wherein the frequency spectrum of the complex conductivity real part, the complex conductivity imaginary part, and the equivalent relative permittivity are calculated from the complex conductivity spectrum;
- a formation factor calculating step of when the hydrate-bearing sediment contains only three media of water, hydrate and quartz sand particles, calculating the formation factor based on Archie's first law; when the hydrate-bearing sediment contains not only the three media of water, hydrate and quartz sand particles, but also clay mineral particles, calculating the formation factor from the complex conductivity real part, the complex conductivity imaginary part and a conductivity of pore water; and
- a permeability calculating step of when the hydrate-bearing sediment contains only the water, the hydrate, and the quartz sand particles, calculating the permeability of the hydrate-bearing sediment based on relaxation time in combination with the hydrate saturation and the formation factor, or based on polarization amplitude in combination with the hydrate saturation and the formation factor; when the hydrate-bearing sediment contains the water, the hydrate, the quartz sand particles, and the clay mineral particles, calculating the permeability of the hydrate-bearing sediment based on the relaxation time in combination with the hydrate saturation and the formation factor, or based on the polarization amplitude in combination with the hydrate saturation and the formation factor, or based on Cation Exchange Capacity (CEC) in combination with the hydrate saturation; and when porous medium in the hydrate-bearing sediment has fractal characteristics and pore size satisfies a fractal scaling relation, calculating the permeability of the hydrate-bearing sediment based on pore radius and fractal dimension in combination with the hydrate saturation.

As an embodiment, the hydrate-bearing sediment includes the hydrate-bearing sediment sample and the formation hydrate-bearing sediment. In the complex conductivity spectrum obtaining step, for the hydrate-bearing sediment sample, the impedance spectrum measurement is performed by a four-probe method, including following specific steps of putting the hydrate-bearing sediment sample in a sample holder, installing a pair of current electrodes and a pair of potential electrodes at both ends of the sample holder, connecting the four electrodes to an impedance analyzer, and measuring the impedance spectrum of the hydrate-bearing sediment sample by the impedance analyzer; for the formation hydrate-bearing sediment, the complex conductivity spectrum is obtained by an induced polarization well-logging method, specifically including following steps of connecting the ground equipment to the current electrodes and the potential electrodes in the well in the field, supplying AC to the current electrodes in the well to generate an electric field in the well, and constantly changing the frequency of AC with rang from 1 mHz to 10 kHz, so as to obtain the complex conductivities at different frequencies and then obtain the complex conductivity spectrum.

As an embodiment, the permeability evaluation method for hydrate-bearing sediment further includes a hydrate occurrence mode correction factor calculating step; Y=1 when the hydrate is in a non-grain-contact occurrence mode, and Y=Y$_1$(f) when the hydrate is in a grain-contact occurrence mode.

$$Y_I(f) = \frac{\sigma''_{nt}(f)}{\sigma''_t(f)}$$

where Y$_1$(f) denotes an occurrence mode correction factor at a frequency f in the grain-contact occurrence mode of the hydrate; $\sigma''_{nt}$ (f) denotes the complex conductivity imaginary part at the frequency f in the non-grain-contact occurrence mode; and $\sigma''_t$ (f) denotes the complex conductivity imaginary part at the frequency f in the grain-contact occurrence mode.

In the permeability calculating step, when the hydrate-bearing sediment contains only the water, the hydrate and the quartz sand particles, calculating the permeability of the hydrate-bearing sediment based on the relaxation time in combination with the hydrate saturation, the occurrence mode correction factor and the formation factor, or based on the polarization amplitude in combination with the hydrate saturation, the occurrence mode correction factor and the formation factor; when the hydrate-bearing sediment contains the water, the hydrate, the quartz sand particles, and the clay mineral particles, calculating the permeability of the hydrate-bearing sediment based on the relaxation time in combination with the hydrate saturation, the occurrence mode correction factor and the formation factor, or based on the polarization amplitude in combination with the hydrate saturation, the occurrence mode correction factor and the formation factor, or based on the CEC in combination with the hydrate saturation and the occurrence mode correction factor; when the porous medium in the hydrate-bearing sediment has the fractal characteristics and the pore size satisfies the fractal scaling relation, calculating the permeability of the hydrate-bearing sediment based on the pore radius and the fractal dimension in combination with the hydrate saturation and the occurrence mode correction factor.

Compared with the prior art, the present application has following beneficial effects.

In the permeability evaluation method for hydrate-bearing sediment provided in at least one embodiment of the present application, the hydrate-bearing sediment sample can be obtained by laboratory-made or by field sampling; low-frequency impedance spectrum measurement is performed on the sample, and the complex conductivity spectrum by conversion can be obtained; or for the formation hydrate-bearing sediment, the ground equipment is used to supply AC to the current electrodes in the well, and the complex conductivity spectrum can be obtained by changing the frequency f of the AC. The hydrate saturation is calculated based on the complex conductivity spectrum. The formation factor is calculated based on Archie's first law or is calculated from the complex conductivity real part, complex conductivity imaginary part and the conductivity of pore water. The permeability of the hydrate-bearing sediment is calculated based on the relaxation time in combination with the hydrate saturation, the occurrence mode correction factor and the formation factor, or based on the polarization amplitude in combination with the hydrate saturation, the occurrence mode correction factor and the formation factor, or based on the CEC in combination with the hydrate saturation and the occurrence mode correction factor, or based on the pore radius and the fractal dimension in combination with the hydrate saturation and the occurrence mode correction factor. The evaluation method provided in the present application allows a large measuring range, low cost and high accuracy, and can accurately obtain the permeability of hydrate-bearing sediment and effectively reflect the micro-pore structure of hydrate-bearing sediment.

BRIEF DESCRIPTION OF THE DRAWINGS

FIG. 3 is a flowchart of a method for calculating hydrate saturation based on the complex conductivity spectrum according to one embodiment;

FIG. 4A is a first geometric model of the hydrate-bearing sediment;

FIG. 4B is a second geometric model of the hydrate-bearing sediment;

FIG. 5A is a curve chart of complex conductivity real part changing with frequency;

FIG. 5B is a power-law fitting linear chart of the complex conductivity real part;

in which, 11 thermostat; 12 impedance analyzer; 13 potential electrode; 14 current electrode; 15 hydrate-bearing sediment sample; 21 drilling fluid, 22 current line, 23 formation; curve A is a complex conductivity spectrum with an obvious peak, and curve B is a complex conductivity spectrum with an obvious inflection point.

DETAILED DESCRIPTION OF THE PRESENT INVENTION

A technical solution of the present application will be described in detail as below by embodiments. However, it should be understood that elements, structures and features in one embodiment may also be advantageously incorporated into other embodiments without further description.

A permeability evaluation method for hydrate-bearing sediment is provided in the present embodiment, which can be used for evaluating the permeability of hydrate-bearing sediment sample (hereinafter referred to as the sample) and the permeability of formation hydrate-bearing sediment. Therefore, in the present application, the hydrate-bearing sediment may refer to either a hydrate-bearing sediment sample or a formation hydrate-bearing sediment, unless otherwise specified. The evaluation method includes the following steps.

S1 Complex Conductivity Spectrum Obtaining Step

When obtaining the complex conductivity spectrum of the hydrate-bearing sediment, since the hydrate-bearing sediment sample is different from the formation hydrate-bearing sediment, the obtaining step of the complex conductivity spectrum may be different. However, the complex conductivity spectrum of either of the above two can be obtained by prior technologies.

1.1 Obtaining the Complex Conductivity Spectrum of the Hydrate-Bearing Sediment Sample The complex conductivity spectrum of the hydrate-bearing sediment sample is obtained by steps as follows. The hydrate-bearing sediment sample is measured to obtain electrical impedance spectrum; using the relationship between electrical impedance and complex resistivity or conductivity, and combining with the length and cross-sectional area of the sample, the complex conductivity spectrum is obtained through conversion based on the definition of complex conductivity.

Figure 1:
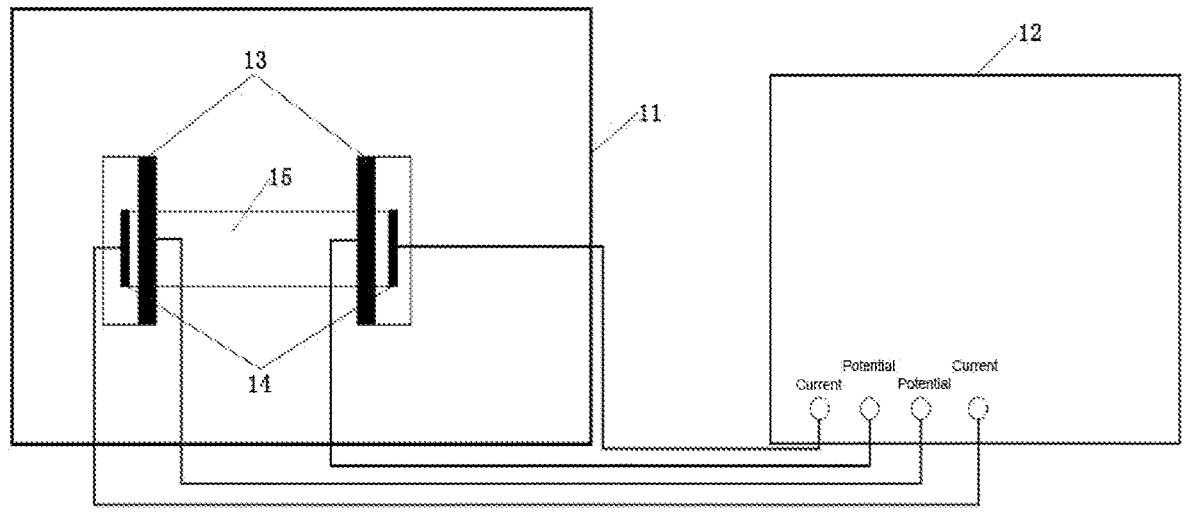
FIG. 1 is a schematic diagram of measuring low-frequency impedance spectrum of a hydrate-bearing sediment sample according to one embodiment.

Specifically, the low-frequency impedance spectrum may be measured by a four-probe method, including following specific steps of: as shown in FIG. 1, putting the sample 15 between a sample holder (in a thermostat 11), installing a pair of current electrodes 14 and a pair of potential electrodes 13 at both ends of the sample holder, connecting the four electrodes to an impedance analyzer 12, and measuring the low-frequency impedance spectrum of the sample 15 by the impedance analyzer 12. In the present embodiment, the impedance analyzer adopts a Zurich MFIA impedance analyzer, with a maximum frequency f measuring range is 1 mHz to 500 kHz, and an impedance measuring range is 1 mΩ to 1 TΩ, and the basic accuracy is 0.05% in the range of 1Ω to 1 MΩ.

Specifically, using the relationship between the electrical impedance and the complex resistivity, and combining with the length and the cross-sectional area of the sample, the complex conductivity is calculated by Formula (1) based on the definition of complex conductivity, and the complex conductivity spectrum can be further obtained.

$$\sigma^* = \frac{1}{\rho^*} = \frac{1}{K_g Z^*} \tag{1}$$

where $\sigma^*$ is the complex conductivity, $\rho^*$ is complex resistivity, $Z^*$ is a measured electrical impedance, $K_g$ is geometrical factor of the sample, $K_g = S/L$, where S is the cross-sectional area of the sample, and L is the length of the sample (namely a distance between the two potential electrodes 13).

Multiple impedances at multiple different frequencies f can be obtained through measurement at the multiple different frequencies f and an electrical impedance spectrum within the frequency range of measurement can be further obtained. Similarly, multiple complex conductivities at multiple different frequencies f can be obtained through measurement or calculation at the different frequencies f and a complex conductivity spectrum within the frequency range of measurement can be further obtained through conversion. Each complex conductivity has a complex conductivity real part and a complex conductivity imaginary part. Each complex conductivity spectrum obtained by the multiple complex conductivities has frequency spectrum of the complex conductivity real part and frequency spectrum of the complex conductivity imaginary part. The complex conductivity at a certain frequency and its corresponding real part and imaginary part can be reversely calculated from the obtained complex conductivity spectrum. It is common knowledge in the prior art and readily comprehensible.

The hydrate-bearing sediment sample is a laboratory-made sample or a sample obtained by field sampling. The laboratory-made sample may be made by the following specific steps using existing preparation methods.

① Natural sea sand of 60-80 mesh is screened, rinsed and dried; and 120 mL of the natural sea sand is taken with a measuring cylinder and put in a reaction kettle for later use.

② The mass of tetrahydrofuran (THF) and distilled water is calculated based on the hydrate saturation predetermined in an experimental scheme (a molar ratio of THF to distilled water is 1:17, 1:22.4, 1:31.3, 1:49.3 and 1:103 when the hydrate saturation is 100%, 80%, 60%, 40% and 20%, respectively); the mass of desired NaCl is calculated according to a mass fraction of 1%; and the volume of desired montmorillonite (as clay) is calculated according to a predetermined content of clay.

③ Montmorillonite of 5,000 mesh is taken with a measuring cylinder; the distilled water, THF and NaCl are respectively weighed with an electronic balance, put in the same beaker in sequence, and stirred and mixed with a glass rod to make THF and NaCl fully dissolved in the distilled water. During stirring, the beaker shall be sealed to avoid volatilization of THF to obtain a THF brine solution.

④ The sea sand and clay are mixed evenly and then filled into the reaction kettle layer by layer, and a certain amount of THF brine solution is injected into each layer of the mixture of sea sand and clay to ensure that pores in the mixture of sea sand and clay are saturated with water. When filled up, the reaction kettle is sealed and pressurized with a blind flange for standing for 24 h.

⑤ Measurement and control software is executed, and the reaction kettle is put in a low-temperature thermostat at a target temperature at 0° C., so as to test a cooling and generating process of THF hydrate. When a large amount of hydrate is generated, the heat released makes the temperature of the reaction system increase significantly, and the process (such as massive generation and completion of hydrate generation) of the experiment can be known by measuring the temperature of the reaction system in real time.

1.2 Obtaining the Complex Conductivity Spectrum of the Formation Hydrate-Bearing Sediment Induced polarization well-logging can be used to evaluate the pore structure and permeability of reservoirs, and can work in frequency domain as well as in time domain. Frequency-domain induced polarization is to supply to the formation with alternating current (AC) at different frequencies f, measure the complex conductivity real part and imaginary part at each frequency f, and perform formation interpretation by the real part and imaginary part at a certain frequency or by parameters of the frequency spectrum of the complex conductivity real part and imaginary part. Time-domain induced polarization is to supply Direct Current (DC) to the formation for a certain period of time, measure response of the formation after power off, and perform formation interpretation by calculated polarizability or attenuation spectrum parameters. Moreover, parameters of frequency-domain induced polarization can be obtained through time-domain induced polarization measurements.

With the permeability evaluation method for hydrate-bearing sediment provided in the present embodiment, the complex conductivity spectrum of the formation hydrate-bearing sediment can be obtained through on-site frequency-domain induced polarization well-logging, and the permeability of the formation hydrate-bearing sediment can be calculated from characteristic parameters (such as the real part, the imaginary part, etc.) of the complex conductivity, thus allowing on-site in-situ quantitative evaluation of the permeability.

The complex conductivity spectrum of the formation hydrate-bearing sediment is obtained as follows. Based on the induced polarization well-logging method, supplying AC to the current electrodes in the well by using the ground equipment, the complex conductivity spectrum is obtained by changing the frequency f of the AC.

Figure 2:
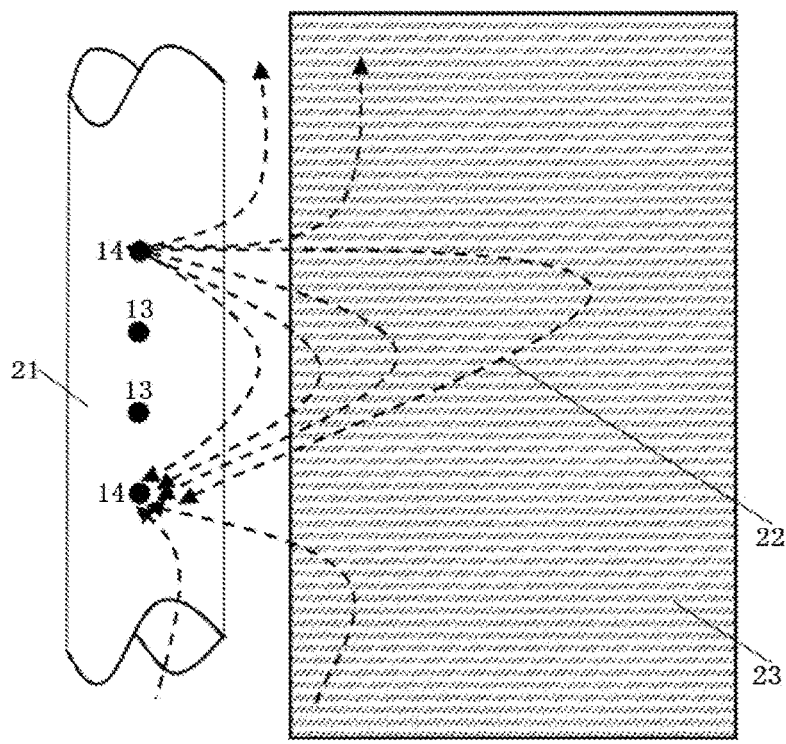
FIG. 2 is a schematic diagram of measuring complex conductivity spectrum of formation hydrate-bearing sediment according to one embodiment.

The complex conductivity spectrum is obtained based on the induced polarization well-logging method, specifically including the following steps of as shown in FIG. 2, connecting the ground equipment to the current electrodes 14 and potential electrodes 13 in the well in the field, supplying AC to the current electrodes 14 in the well to generate an electric field therein, and constantly changing the AC frequency f ranging from 1 mHz to 10 kHz, so as to obtain complex conductivities at different frequencies f and then obtain the complex conductivity spectrum of the hydrate-bearing sediment in the formation 23. The ground equipment is existing well-logging equipment, mainly including a well-logging information acquisition system, a well-logging process control and information acquisition system, a power supply system, and a computer control program system etc.

S2 Hydrate Saturation Calculating Step

The complex conductivity spectrum can be used to calculate the frequency spectrum of the complex conductivity real part, the frequency spectrum of the complex conductivity imaginary part, and the complex conductivity and its corresponding real part and imaginary part at any frequency f within the measured frequency range. The hydrate saturation $S_h$ is calculated from the frequency spectrum of the complex conductivity real part, the complex conductivity imaginary part and equivalent relative permittivity, respectively. The relationship between the hydrate saturation $S_h$ and water saturation $S_w$ meets: $S_w=1-S_h$. Specifically, the hydrate saturation calculating step is as follows.

The complex conductivity as a function of an angular frequency ω is expressed as:

$$\sigma^*(\omega)=\sigma'(\omega)+i\sigma''(\omega) \quad (2)$$

where, $\sigma^*$ is the complex conductivity, $\sigma'$ is the complex conductivity real part, $\sigma''$ is the complex conductivity imaginary part, and w is an angular frequency, which is related to the frequency f as ω=2πf Unless otherwise specified in the present application, the frequency basically refers to the frequency f.

2.1 The hydrate saturation $S_h$ is calculated from the frequency spectrum of the complex conductivity real part $\sigma'$.

At a low frequency band in the frequency f range of 1 mHz to 10 Hz, the hydrate saturation $S_h$ is calculated by the formula $\sigma'=3.59(1-S_h)^{1.30}$.

At a high frequency band in the frequency f range of 500 Hz to 100 kHz, the hydrate saturation $S_h$ is calculated by the formula $\sigma'=4.06(1-S_h)^{1.34}$.

2.2 The hydrate saturation $S_h$ is calculated from the complex conductivity imaginary part $\sigma''$.

At the frequency f of 1 mHz, the hydrate saturation $S_h$ is calculated by $\sigma''=1.88\times10^{-5}(1-S_h)^{2.94}$.

At the frequency f of 0.1 Hz, the hydrate saturation $S_h$ is calculated by $\sigma''=1.88\times10^{-3}(1-S_h)^{2.94}$.

At the frequency f of 100 Hz, the hydrate saturation $S_h$ is calculated by $\sigma''=1.09\times10^{-1}(1-S_h)^{-0.42}$.

At the frequency f of 1 kHz, the hydrate saturation $S_h$ is calculated by $\sigma''=1.28\times10^{-2}(1-S_h)^{-0.91}$.

2.3 The hydrate saturation $S_h$ is calculated from the equivalent relative permittivity $\varepsilon_{eff}$.

At the frequency f of 1 mHz, the hydrate saturation $S_h$ is calculated by $e_{eff}=3.37\times10^5(1-S_h)^{2.94}$.

At the frequency f of 100 Hz, the hydrate saturation $S_h$ is calculated by $\varepsilon_{eff}=1.96\times10^4(1-S_h)^{-0.42}$. At the frequency f of 1 kHz, the hydrate saturation $S_h$ is calculated by $e_{eff}=2.30\times10^2(1-S_h)^{-0.91}$.

The equivalent relative permittivity at any one frequency can be calculated from the complex conductivity imaginary part at the same frequency, and the calculation formula can adopt $$\varepsilon_{eff} = \frac{\sigma''}{8.854 \times 10^{-12}\omega}.$$

In addition, since the hydrate saturation $S_h$ can be calculated by various methods, for later use (such as in S5), the hydrate saturation $S_h$ may be preferably calculated from the frequency spectrum of the complex conductivity real part in 2.1, followed by the calculation of the hydrate saturation $S_h$ from the complex conductivity imaginary part in 2.2 or from the equivalent relative permittivity in 2.3. Since the equivalent relative permittivity in 2.3 is calculated from the complex permittivity imaginary part in 2.2, the $S_h$ calculated in 2.2 and 2.3 is roughly consistent.

More specifically, the formulas for hydrate saturation are all fitting formulas, which may be obtained by the following solution methods.

Firstly, a two-dimensional geometric model of the hydrate-bearing sediment to be established, and a numerical modeling scheme can be realized by a finite element simulation platform COMSOL Multiphysics (v5.6). The geometric model of the hydrate-bearing sediment is as shown in FIGS. 4A and 4B, in which large dark circles represent quartz sand particles, large light circles represent clay mineral particles, small circles between the large circles represent hydrate, and gaps between the circles represent pore water. Phases (including pore water, quartz sand particles, clay mineral particles, and hydrate) in the geometric model are distinguished by assigning corresponding electrical parameters (i.e., equivalent conductivity and equivalent relative permittivity). Different hydrate saturation and different micro-occurrence modes of the hydrate can be obtained by controlling the area and position of each circle.

Based on the established geometric model, under the different hydrate saturation $S_h$ obtained, equations of an electric field model are solved by a finite element method. Specifically, based on the established geometric model, under the different hydrate saturation $S_h$ obtained, set the electrical potentials on both sides (left and right sides as shown in FIGS. 4A and 4B) of the geometric model, obtain the electrical current by solving the electric field model and calculate to obtain the complex conductivity spectrum at the different hydrate saturation $S_h$; thus obtain a fitting curve of the hydrate saturation with the complex conductivity real part, the imaginary part and the equivalent relative permittivity respectively, and the fitting formulas for computing hydrate saturation are obtained by the fitting curves.

The established electric field model based on Ohm's law and constitutive relation at a certain hydrate saturation $S_h$ obtained is shown in Formula (3):

$$\nabla \cdot J = \nabla \cdot (\sigma E + i\omega\varepsilon_0 \varepsilon E) = 0$$

$$E = -\nabla V \quad (3)$$

The above formula is the equation of the electric field model; where J denotes the total current density in A/m²; ω denotes the angular frequency in rad/s; σ denotes the conductivity in S/m; E denotes the electric field strength in V/m; $\varepsilon_0$ denotes the absolute permittivity in vacuum, which is $8.854 \times 10^{-12}$ F/m; ε denotes the relative permittivity; V is the scalar potential in V.

The total current density J is expressed in the form of Ohm's law.

$$J = \sigma E + i\omega\varepsilon_0 \varepsilon E = \sigma^* E \quad (4)$$

Therefore, the complex conductivity σ* can be determined by supplying current in a certain frequency f range and measuring corresponding voltage amplitude and phase shift.

Figure 6A:
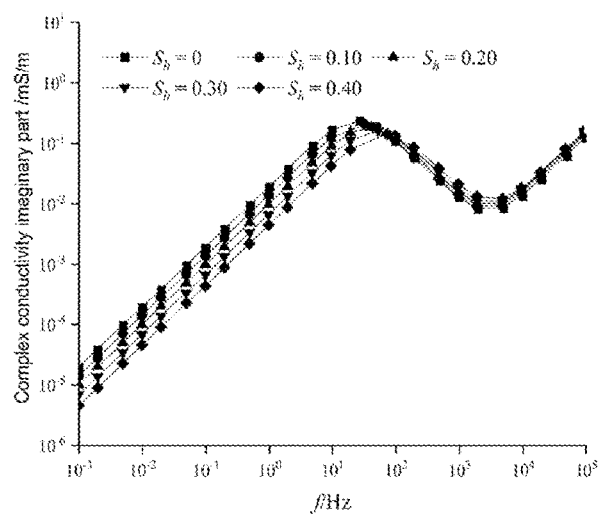
FIG. 6A is a curve chart of the complex conductivity imaginary part changing with frequency.
Figure 6B:
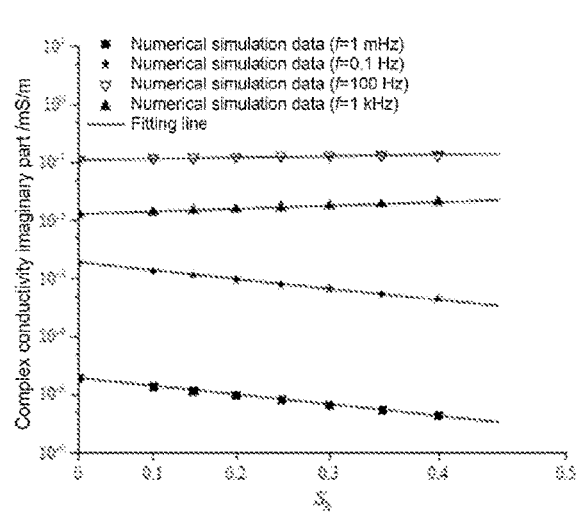
FIG. 6B is a power-law fitting linear chart of the complex conductivity imaginary part.
Figure 7A:
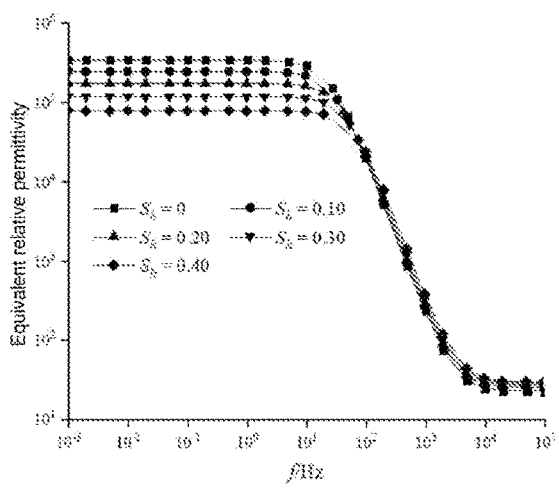
FIG. 7A is a curve chart of equivalent relative permittivity changing with frequency.
Figure 7B:
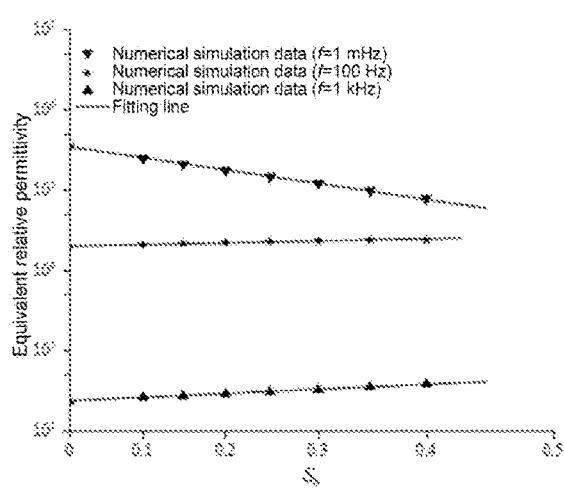
FIG. 7B is a power-law fitting linear chart of the equivalent relative permittivity.

The fitting formulas for hydrate saturation proposed in the present application are applicable when the clay mineral content is 0-50%. In a specific embodiment, FIGS. 5A, 6A, and 7A are relationship charts (i.e., the complex conductivity spectrum or the complex conductivity frequency spectrum) between the complex conductivity real part, the complex conductivity imaginary part, the equivalent relative permittivity, of the hydrate-bearing porous medium obtained at the different hydrate saturation $S_h$, and the frequency f, respectively. Further, FIGS. 5B, 6B and 7B show the fitting curves of the hydrate saturation $S_h$ with the complex conductivity real part, complex conductivity imaginary part, and the equivalent relative permittivity, respectively. The fitting formulas for hydrate saturation in the embodiment can be obtained by these fitting curves.

S3 Occurrence Mode Correction Factor Calculating Step

Hydrate exists in the sediment in various micro-occurrence modes, which may be divided into a grain-contact occurrence mode and a non-grain-contact occurrence mode. For different hydrate occurrence modes, when the hydrate is generated and distributed at different positions, the current conduction paths in pore space are different, which leads to different conductivities of the hydrate-bearing sediment as a whole, and different complex conductivity real part and complex conductivity imaginary part.

In the grain-contact occurrence mode, the hydrate is in direct contact with rock particles, which will change the surface state of the rock particles, affect the polarization function of an electrical double layer at low frequency and further affect the surface conductivity of the rock particles (the surface conductivity contributes to both the complex conductivity real part and imaginary part of the sediment), thus affecting the complex conductivity real part and imaginary part of the hydrate-bearing sediment. In the non-grain-contact occurrence mode, the hydrate is not in contact with the surface of the rock particles, which will not destroy the polarization function of the electrical double layer at low frequency but affect the complex conductivity real part and imaginary part in a way different from that in the grain-contact occurrence mode. Also, the different hydrate occurrence modes in the sediment can affect the permeability of the hydrate-bearing sediment and the quantitative relationship between the permeability and hydrate saturation.

The present application proposes a method for calculating the permeability of hydrate-bearing sediment according to the difference in hydrate occurrence modes and complex conductivity parameters (including the real part and imaginary part), respectively. First, a dimensionless number Y is defined as a correction factor for the micro occurrence mode of the hydrate; when in the non-grain-contact occurrence mode, Y=1; and when in the grain-contact occurrence mode, Y can be determined by the following method.

A numerical simulation method (consistent with the modeling method for obtaining the saturation fitting formulas in S2) is adopted to establish numerical models of the hydrate-bearing sediment in different occurrence modes, to obtain the complex conductivity spectrum in the non-grain-contact occurrence mode and the complex conductivity spectrum in the grain-contact occurrence mode, and then to obtain the complex conductivity imaginary parts in different occurrence modes.

$$Y_f(f) = \frac{\sigma''_{nt}(f)}{\sigma''_f(f)} \quad (5)$$

where $Y_f(f)$ denotes the occurrence mode correction factor at the frequency f in the grain-contact occurrence mode of the hydrate; $\sigma''_{nt}(f)$ denotes the complex conductivity imaginary part at the frequency f in the non-grain-contact occurrence mode; and $\sigma''_f(f)$ denotes the complex conductivity imaginary part at the frequency f in the grain-contact occurrence mode. It can be seen that the complex conductivities in both the non-grain-contact and grain-contact occurrence modes need to be calculated for calculating $Y_f(f)$.

Usage of Y: The occurrence mode of hydrate is determined based on well-known technologies (such as Nuclear Magnetic Resonance technology, and X-ray CT technology), and the occurrence mode correction factor is selected based on different occurrence modes, i.e., Y=1 or Y=$Y_f(f)$.

Figure 8A:
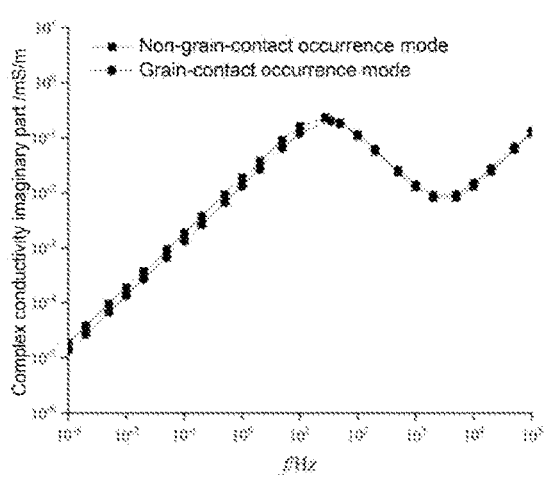
FIG. 8A shows frequency spectrum of the complex conductivity imaginary part in different occurrence modes of hydrate.
Figure 8B:
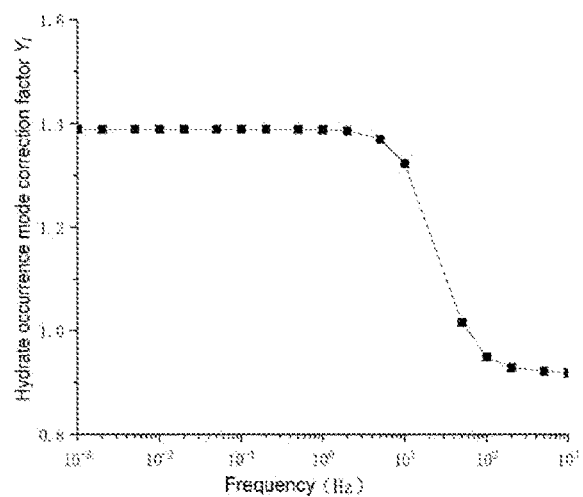
FIG. 8B shows hydrate occurrence mode correction factors at different frequencies obtained by the frequency spectrum of the complex conductivity imaginary part.

In a specific embodiment, FIG. 8A shows frequency spectrum of the complex conductivity imaginary parts obtained in different occurrence modes of the hydrate. The occurrence mode correction factors $Y_f(f)$ at different frequencies, as shown in FIG. 8B, can be obtained based on the frequency spectrum of the complex conductivity imaginary parts in FIG. 8A.

S4 Formation Factor Calculating Step

When the hydrate-bearing sediment contains only three media of water, hydrate and quartz sand particles, the formation factor is calculated by Archie's first law. When the hydrate-bearing sediment contains not only water, hydrate and quartz sand particles, but also clay mineral particles, the formation factor is calculated by using the complex conductivity real part, complex conductivity imaginary part and the conductivity of the pore water of the hydrate-bearing sediment.

4.1 The Formation Factor is Calculated by Archie's First Law by Formula (6):

$$F = \phi^{-m} \tag{6}$$

where F is the formation factor; ϕ is the porosity of the hydrate-bearing sediment, which can be obtained by experimental tests for the hydrate-bearing sediment sample, and which can be obtained by field tests or inversion calculation of the complex conductivity spectrum for the formation hydrate-bearing sediment; m denotes a cementation index, m=1.495.

4.2 The complex conductivity real part and complex conductivity imaginary part are calculated from the measured complex conductivity spectrum; and the formation factor is calculated by using the complex conductivity real part, complex conductivity imaginary part and the conductivity of the pore water by Formula (7):

$$F = \frac{\sigma_w}{\sigma' - \sigma''/I} \tag{7}$$

where $\sigma_w$ is the conductivity of the pore water, which can be obtained by experimental tests for the hydrate-bearing sediment sample, and which can be obtained by field tests for the formation hydrate-bearing sediment; and I is a ratio of polarization intensity to surface conduction intensity in the pore space, which is dimensionless and I=0.042.

Thus, the formation factor F at any frequency f can be obtained by Formula (6) or (7).

S5 Permeability Calculating Step

When the hydrate-bearing sediment contains only water, hydrate, and quartz sand particles, the permeability of the hydrate-bearing sediment is calculated based on relaxation time in combination with the hydrate saturation, the occurrence mode correction factor, and the formation factor, or based on polarization amplitude in combination with the hydrate saturation, the occurrence mode correction factor, and the formation factor. When the hydrate-bearing sediment contains water, hydrate, quartz sand particles, and clay mineral particles, the permeability of the hydrate-bearing sediment is calculated based on the relaxation time in combination with the hydrate saturation, the occurrence mode correction factor, and the formation factor, or based on the polarization amplitude in combination with the hydrate saturation, the occurrence mode correction factor, and the formation factor, or based on Cation Exchange Capacity (CEC) in combination with the hydrate saturation, and the occurrence mode correction factor. When the porous medium of the hydrate-bearing sediment has fractal characteristics and its pore size satisfies a fractal scaling relation, the permeability of the hydrate-bearing sediment is calculated based on the pore radius and fractal dimension in combination with the hydrate saturation, and the occurrence mode correction factor.

5.1 The permeability of the hydrate-bearing sediment is calculated based on the relaxation time in combination with the hydrate saturation, the occurrence mode correction factor, and the formation factor, including specific steps as follows:

5.1.1 When the pore size serves as a scale, i.e. the relaxation time r is considered to be controlled by the pore radius Δ;

for Y=1 in the non-grain-contact occurrence mode, the permeability of the hydrate-bearing sediment is:

$$K = \frac{\tau(S_h = 0)D_i}{4F}(1 - S_h)^{3n} \tag{8.1}$$

for $Y=Y_f(f)$ in the grain-contact occurrence mode, the permeability of the hydrate-bearing sediment is:

$$K = \frac{\tau(S_h = 0)D}{4F}(1 - S_h)^{3n}Y_f(f) \tag{8.2}$$

where $\tau(S_h=0)$ denotes a characteristic relaxation time when the hydrate saturation is 0;

$$D_i = \frac{K_b T \beta_{(+)}^s}{|q_+|}$$

denotes a diffusion coefficient of counterions with unit of m²/s; $K_b$ denotes Boltzmann constant, which is 1.3807×10⁻²³ JK⁻¹; T denotes an absolute temperature with unit of Kelvin; |q₊|denotes an absolute value of counterions charge in Stem layer, which is 1.6×10⁻¹⁹C; $B_{(+)}^S$ denotes an ion mobility in the Stem layer; when the hydrate-bearing sediment contains only quartz sand particles, water and hydrate, $B_{(+)}^S$=5.19×10⁻⁸ m²s⁻¹V⁻¹, $D_i$=1.32×10⁻⁹ m²s⁻¹, and when the hydrate-bearing sediment contains quartz sand particles, water, hydrate and clay minerals, +)=1.5×10¹⁰ m²s⁻¹V⁻¹, $D_i$=3.8×10⁻¹² m²s⁻¹; n is a saturation index, n=1.69.

5.1.2 When an average diameter of spherical particles serves as a scale, i.e., the relaxation time z is considered to be controlled by the average diameter $d_0$ of the particle;

for Y=1 in the non-grain-contact occurrence mode, the permeability of the hydrate-bearing sediment is:

$$K = \frac{\tau(S_h = 0)D_i}{4m^2[F(1 - S_h)^{-n} - 1]^2 F}(1 - S_h)^{3n} \tag{9.1}$$

for $Y=Y_f(f)$ in the grain-contact occurrence mode, the permeability of the hydrate-bearing sediment is:

$$K = \frac{\tau(S_h = 0)D_i}{4m^2[F(1 - S_h)^{-n} - 1]^2 F}(1 - S_h)^{3n}Y_f(f) \tag{9.2}$$

where m denotes the cementation index, m=1.495; and other parameters can refer to the Formula 8.

Figure 9:
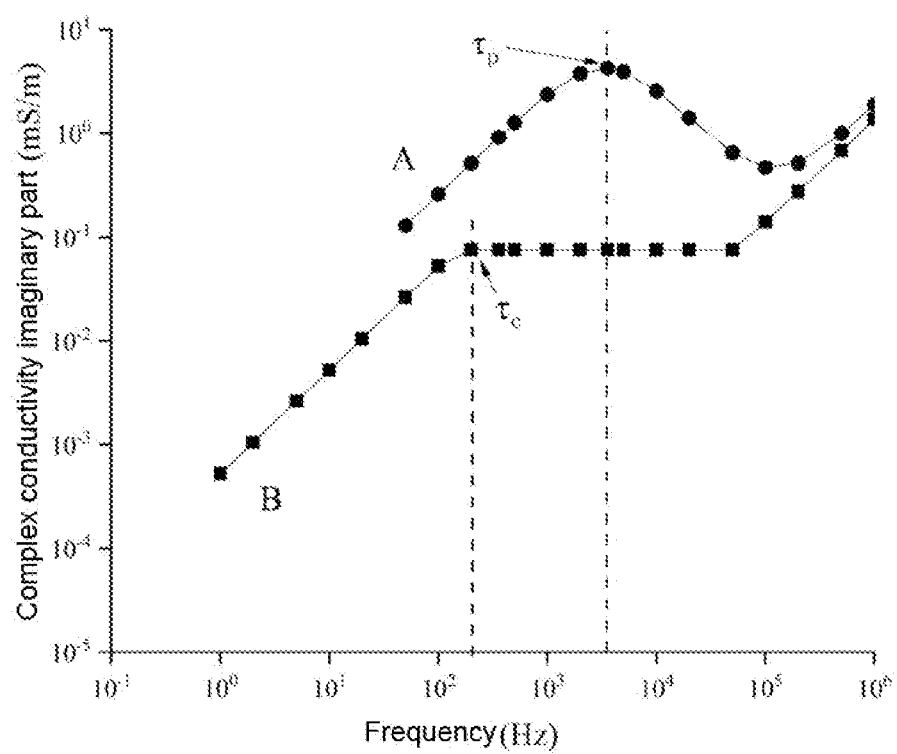
FIG. 9 shows frequency spectrum of the complex conductivity imaginary part of the hydrate-bearing sediment according to one embodiment.

In order to calculate the parameter z in Formulas (8) and (9), the relaxation time z can be obtained through the analysis of the frequency spectrum of the complex conductivity imaginary part. Specifically, as shown in FIG. 9, when the frequency spectrum of the complex conductivity imaginary part has an obvious peak (shown in curve A), a peak relaxation time $\tau_p$ is calculated from the frequency $f_p$ at the peak, i.e., $\tau=\tau_p$. Alternatively, when the frequency spectrum of the complex conductivity imaginary part has an inflection point (shown in curve B), an inflection point relaxation time $\tau_e$ is calculated from the frequency $f_c$ at the inflection point (an inflection point at which the complex conductivity imaginary part decreases rapidly with decreasing frequency), i.e., $\tau=\tau_e$. Alternatively, when the frequency spectrum of the complex conductivity imaginary part has no peak or inflection point, a Debye relaxation time $T_D$ is obtained through Debye decomposition, i.e., $\tau=\tau_D$.

The method for obtaining the Debye relaxation time $T_D$ through Debye decomposition is specifically as follows: the complex conductivity spectrum is fitted by a Debye function:

$$\sigma^*(\omega) = j\frac{\sigma_0}{\left[1 - \sum_{i=1}^{j} m_i \times \left(1 - \frac{1}{1 + i\omega\tau_i}\right)\right]},$$

thereafter, parameters $\sigma_0$, $m_i$, and $z_i$ in the Debye decomposition model can be obtained (e.g., by genetic algorithm, and simulated annealing algorithm), to obtain a total polarizability $$m_t = \sum_{i=1}^{j} m_i;$$

the Debye relaxation time is $$\tau_D = \exp\left(\frac{1}{m_t}\sum_{i=1}^{j} m_i \ln(\tau_i)\right),$$

where j indicates that there are j pairs of relaxation time and polarizability.

With the above method, the characteristic relaxation time $\tau(S_h=0)$ at the hydrate saturation of 0 can be calculated, and the permeability of the hydrate-bearing sediment can be obtained by Formulas (8) and (9) accordingly.

5.2 The polarization amplitude includes the complex conductivity imaginary part and a normalized polarizability, i.e., the polarization amplitude can be reflected by the complex conductivity imaginary part and the normalized polarizability. The permeability of the hydrate-bearing sediment is calculated based on the polarization amplitude in combination with the hydrate saturation, the occurrence mode correction factor, and the formation factor, including specific steps as follows.

If the complex conductivity of the hydrate-bearing sediment is measured at a single frequency f, the complex conductivity imaginary part at the single frequency is calculated from the complex conductivity.

Based on the relationship between the complex conductivity imaginary part and the permeability at the single frequency (for example f=0.01 Hz, 0.1 Hz, 1 Hz, 10 Hz, 100 Hz, and 1000 Hz):

for Y=1 in the non-grain-contact occurrence mode, the permeability of the hydrate-bearing sediment is:

$$K = \frac{2.66 \times 10^{-7}}{F^b(\sigma'')^c}(1 - S_h)^n \quad (10.1)$$

for $Y=Y_f(f)$ in the grain-contact occurrence mode, the permeability of the hydrate-bearing sediment is:

$$K = \frac{2.66 \times 10^{-7}}{F^b(\sigma'')^c}(1 - S_h)^n Y_f(f) \quad (10.2)$$

where b and c are constants, which can be obtained by fitting experimental data for the hydrate-bearing sediment sample, and which can be obtained by fitting well-logging data for the formation hydrate-bearing sediment; and in this embodiment, b=5.35 and c=0.66.

If the complex conductivity spectrum of the hydrate-bearing sediment is measured at multiple different frequencies f, the complex conductivity spectrum is fitted by using the Debye decomposition model $$\sigma^*(\omega) = \frac{\sigma_0}{\left[1 - \sum_{i=1}^{j} m_i \times \left(1 - \frac{1}{1 + i\omega\tau_i}\right)\right]},$$

obtaining the parameters in the Debye decomposition model, and thus the first normalized polarizability $M_n$ based on the Debye decomposition model is obtained:

$$M_n = \sum_{i=1}^{j} m_i \sigma_0 \quad (11)$$

where $\sigma_0$ and $m_i$ are parameters in the Debye decomposition model, and j indicates that there are j pairs of relaxation time and polarizability.

Further:

for Y=1 in the non-grain-contact occurrence mode, the permeability of the hydrate-bearing sediment is:

$$K = \frac{8.69 \times 10^{-7}}{F^r(M_n)^x}(1 - S_h)^n \quad (12.1)$$

for $Y=Y_f(f)$ in the grain-contact occurrence mode, the permeability of the hydrate-bearing sediment is:

$$K = \frac{8.69 \times 10^{-7}}{F^r(M_n)^x}(1 - S_h)^n Y_f(f) \quad (12.2)$$

where r and x are constants, might be r=5.38 and x=0.79, which can be obtained by fitting experimental data for the hydrate-bearing sediment sample and which can be obtained by fitting well-logging data for the formation hydrate-bearing sediment.

5.3 When the hydrate-bearing sediment contains water, hydrate, quartz sand particles and clay mineral particles, the clay mineral particles have cation adsorption and hydro-expansiveness, which affect the pore structure of the porous medium in the hydrate-bearing sediment greatly, and in turn affects the permeability of the porous medium. The complex conductivity of the porous medium in the hydrate-bearing sediment is derived from two aspects; one is the conductivity of pore water (mainly dependent on the content and salinity of the pore water) and the other is the surface conductivity of rock particles (mainly controlled by the Cation Exchange Capacity (CEC) of the porous medium). When the clay particles are attached to the surface of the rock particles, the overall conductivity of the rock particles will change due to the influence of the CEC. The CEC of the porous medium in the hydrate-bearing sediment is proportional to a specific surface area of the sediment. Therefore, the permeability of the hydrate-bearing sediment is calculated from the CEC calculated from the complex conductivity spectrum, in combination with the hydrate saturation and the occurrence mode correction factor. Specifically, the permeability of the hydrate-bearing sediment is calculated based on the CEC, in combination with the hydrate saturation, and the occurrence mode correction factor, including specific steps as follows.

The complex conductivity imaginary part at different frequencies (any two different frequencies $f_1 < f_2$) is calculated from the complex conductivity spectrum of the hydrate-bearing sediment, and thus the second normalized polarizability $M_n(f_1, f_2)$ is obtained as follows:

$$M_n(f_1, f_2) = -\frac{2\sigma''_{f_1 f_2}(\ln A)}{\pi} \quad (13)$$

where $\sigma''_{f_1 f_2}$ is the complex conductivity imaginary part corresponding to a geometric mean of the frequencies $f_1$ and $f_2$, and $A = f_2/f_1$ denotes the quotient of the frequency $f_2$ and the frequency $f_1$. Relatively, $f_2$ is a high frequency and $f_1$ is a low frequency.

The CEC is obtained by the second normalized polarizability $M_n(f_1, f_2)$ as follows:

$$CEC = \frac{M_n(f_1, f_2)}{(1 - S_h)^{m-1} \rho_g \lambda \phi^{m-1}} \quad (14)$$

where the CEC denotes cation exchange capacity with unit of C/kg; $\rho_g$ denotes a particle density, $\rho_g = 2650$ kg/m$^3$; and $\lambda$ denotes the mobility of counterions during polarization, $\lambda = 3.0 \pm 0.7 \times 10^{-10}$ m$^2$s$^{-1}$V$^{-1}$.

According to the CEC:

for $Y=1$ in the non-grain-contact occurrence mode, the permeability of the hydrate-bearing sediment is:

$$K = \frac{k_0 \phi^6}{(\rho_g CEC)^2}(1 - S_h)^6 \quad (15.1)$$

for $Y = Y_f(f)$ in the grain-contact occurrence mode, the permeability of the hydrate-bearing sediment is:

$$K = \frac{k_0 \phi^6}{(\rho_g CEC)^2}(1 - S_h)^6 Y_f(f) \quad (15.2)$$

where $k_0$ is a constant and $k_0 = 10^{4.3}$.

5.4 Since the porous medium in the hydrate-bearing sediment has fractal characteristics and has pore size satisfying the fractal scaling relation, the pore size distribution is inversely calculated from the complex conductivity, then the fractal dimension is calculated from the pore size, and finally the permeability of the hydrate-bearing sediment is calculated from the fractal dimension. Specifically, the permeability of the hydrate-bearing sediment is calculated based on the pore radius and the fractal dimension, in combination with the hydrate saturation and the occurrence mode correction factor, including specific steps as follows.

The pore radius is first inversely calculated by Fourier transform to obtain $\Delta_{max,h}$, $\Delta_{max,0}$ and $\Delta_{min,0}$.

Specifically, the complex conductivity of the hydrate-bearing sediment may be expressed by Formula (16):

$$\sigma^* = \sigma_\infty - M_n \int_0^\infty \frac{g(\tau)}{1 + i\omega\tau} d\tau + i\omega\varepsilon_\infty \quad (16)$$

where $\sigma_\infty$ is the instantaneous conductivity, $M_n$ is the first normalized polarizability, $g(\tau)$ denotes a relaxation time distribution, $\tau$ is the relaxation time, and $\varepsilon_\infty$ denotes the permittivity of a medium (e.g., the hydrate-bearing sediment) at frequency (e.g., a frequency range from 100 Hz to 10 kHz) for Maxwell-Wagner polarization (i.e., interfacial polarization).

The complex conductivity imaginary part is separated from the complex conductivity, given:

$$z = -\ln(\omega) \Leftrightarrow \omega = e^{-z} \quad (17)$$

$$s = \ln(\tau) \Leftrightarrow \tau = e^s$$

$$G(s) = \tau g(\tau)$$

then:

$$\sigma''_z(z) = -\int_{-\infty}^{+\infty} G(s) \frac{1}{2\cosh(z-s)} ds \quad (18)$$

Fourier transform is performed on Formula (18), and inverse Fourier transform is performed on $G(s)$ to obtain:

$$G(s) = -\frac{2}{\pi} FT^{-1}[\tilde{\sigma}''_\eta(\eta)\cosh(\pi^2\eta)] \quad (19)$$

where $FT^{-1}$ denotes the inverse Fourier transform operation, the symbol '~' denotes a Fourier transform result, and $\eta$ denotes a frequency of Fourier space.

The relaxation time distribution $g(\tau)$ is calculated based on the relation between $G(s)$ and $g(\tau)$. By using $$\tau = \frac{\Lambda^2}{2D_i},$$

the maximum pore radius $\Delta_{max,h}$ when the hydrate saturation is not 0, the maximum pore radius $\Delta_{max,0}$ when the hydrate saturation is 0, and the minimum pore radius $\Delta_{min,0}$ when the hydrate saturation is 0, are calculated.

Further, the fractal dimension $D_{f,0}$ when the hydrate saturation is 0 is calculated.

$$D_{f,0} = 2 - \frac{\ln \phi}{\ln\left(\frac{\Delta_{min,0}}{\Delta_{max,0}}\right)} \quad (20)$$

Further, the fractal dimension $D_{f,h}$ when the hydrate saturation is not 0 is calculated.

$$D_{f,h} = D_{f,0} - \frac{\ln(1 - S_h)}{\ln \phi}(2 - D_{f,0}) \quad (21)$$

Further:

for $Y=1$ in the non-grain-contact occurrence mode, the permeability of the hydrate-bearing sediment is:

$$K = \frac{\pi}{128\tau_h S} \frac{D_{f,h}}{4 - D_{f,h}} \Lambda_{max,h}^4 \qquad (22.1)$$

for $Y=Y_I(f)$ in the grain-contact occurrence mode, the permeability of the hydrate-bearing sediment is:

$$K = \frac{\pi}{128\tau_h S} \frac{D_{f,h}}{4 - D_{f,h}} \Lambda_{max,h}^4 Y_I(f) \qquad (22.2)$$

where $\tau_h$ denotes tortuosity at different hydrate contents, and $\tau_h = \sqrt{1+2[1-\phi(1-S_h)]}$; for the hydrate-bearing sediment sample, S denotes a cross-sectional area of the sample, which is obtained by experimental tests; for the formation hydrate-bearing sediment, S denotes an equivalent cross-sectional area of the formation sediment, which is obtained by detection performance specifications (such as a factor of a well-logging instrument) of the well-logging instrument.

The above steps may be adjusted according to the actual needs, and thus will not set an absolute limit on the scope of protection of the present application. In addition, the following needs to be noted.

Figure 10:
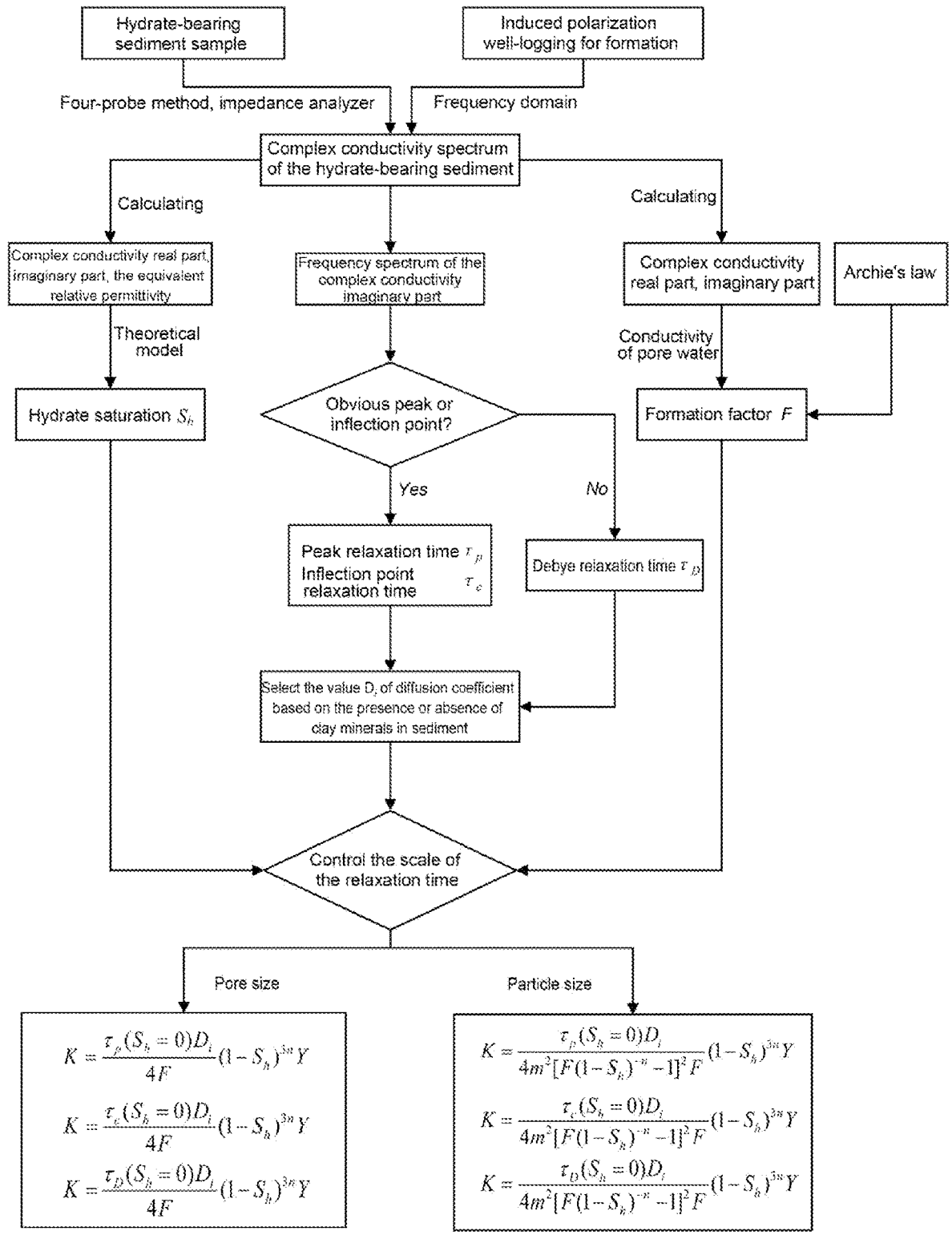
FIG. 10 is a flowchart of a method for calculating permeability of hydrate-bearing sediment based on relaxation time, hydrate saturation, the occurrence mode correction factor and formation factor according to one embodiment.

(1) The permeability of the hydrate-bearing sediment sample is calculated based on the relaxation time in combination with the hydrate saturation, the occurrence mode correction factor and the formation factor, as shown in FIG. 10. When the relaxation time is considered to be controlled by the pore size, the frequency spectrum of the complex conductivity imaginary part of the hydrate-bearing sediment is observed for any obvious peak. If there is an obvious peak, the relaxation time is calculated by $$f_p = \frac{1}{2\pi\tau_p}$$

at that frequency. If there is an obvious inflection point, the relaxation time is calculated by $$f_c = \frac{1}{2\pi\tau_c}$$

at that frequency. If no obvious peak or inflection point is found, the relaxation time is obtained by fitting the complex conductivity spectrum through the Debye model, i.e., the complex conductivity spectrum is fitted by the Debye function:

$$\sigma^*(\omega) = \frac{\sigma_0}{\left[1 - \sum_{i=1}^{j} m_i \times \left(1 - \frac{1}{1+i\omega\tau_i}\right)\right]};$$

thereafter, parameters $\sigma_0$, $m_i$, and $\tau_i$ in the Debye decomposition model can be obtained (e.g., by genetic algorithm, and simulated annealing algorithm), to obtain the total polarizability $$m_t = \sum_{i=1}^{j} m_i;$$

and the Debye relaxation time is $$\tau_D = \exp\left(\frac{1}{m_t} \sum_{i=1}^{j} m_i \ln(\tau_i)\right)$$

('exp' denotes an exponential function with a natural constant e as the base).

Further, whether the hydrate-bearing sediment contains clay minerals or not is determined, and the diffusion coefficient $D_i$ of the counterions is selected under appropriate conditions; if not containing clay minerals, $D_i=1.32\times10^{-9}$ m$^2$s$^{-1}$; and if containing clay minerals, $D_i=3.8\times10^{-12}$ m$^2$s$^{-1}$.

Further, the hydrate saturation $S_h$ and the formation factor F are calculated by the theoretical models for the hydrate saturation and formation factor proposed in the above method of the present application.

Finally, for $Y=1$ in the non-grain-contact occurrence mode, the permeability of the hydrate-bearing sediment is calculated by:

$$K = \frac{\tau_p(S_h=0)D_i}{4F}(1-S_h)^{3n}$$

$$K = \frac{\tau_c(S_h=0)D_i}{4F}(1-S_h)^{3n}$$

$$K = \frac{\tau_D(S_h=0)D_i}{4F}(1-S_h)^{3n}$$

for $Y=Y_I(f)$ in the grain-contact occurrence mode, the permeability of the hydrate-bearing sediment is calculated by:

$$K = \frac{\tau_p(S_h=0)D_i}{4F}(1-S_h)^{3n}Y_I(f)$$

$$K = \frac{\tau_c(S_h=0)D_i}{4F}(1-S_h)^{3n}Y_I(f)$$

$$K = \frac{\tau_D(S_h=0)D_i}{4F}(1-S_h)^{3n}Y_I(f)$$

Also as shown in FIG. 10, when the relaxation time is considered to be controlled by the average particle diameter, the frequency spectrum of the complex conductivity imaginary part of the hydrate-bearing sediment is observed for any obvious peak. If there is an obvious peak, the relaxation time is calculated by $$f_p = \frac{1}{2\pi\tau_p}$$

at that frequency. If there is an obvious inflection point, the relaxation time is calculated by $$f_c = \frac{1}{2\pi\tau_c}$$

at that frequency. If no obvious peak or inflection point is found, the relaxation time is obtained by fitting the complex conductivity spectrum through the Debye model, i.e., the complex conductivity spectrum is fitted by the Debye function:

$$\sigma^*(\omega) = \frac{\sigma_0}{\left[1 - \sum_{i=1}^{j} m_i \times \left(1 - \frac{1}{1+i\omega\tau_i}\right)\right]};$$

thereafter, parameters $\sigma_0$, $m_i$, and $\tau_i$ in the Debye decomposition model can be obtained (e.g., by genetic algorithm, and simulated annealing algorithm), to obtain the total polarizability $$m_t = \sum_{i=1}^{j} m_i;$$

and the Debye relaxation time is $$\tau_D = \exp\left(\frac{1}{m_t}\sum_{i=1}^{j} m_i \ln(\tau_i)\right)$$

('exp' denotes an exponential function with a natural constant 'e' as the base).

Further, whether the hydrate-bearing sediment contains clay minerals or not is determined, and the diffusion coefficient $D_i$ of counterions is selected under appropriate conditions; if not containing clay minerals, $D_i=1.32\times10^{-9}$ m²s⁻¹; and if containing clay minerals, $D_i=3.8\times10^{12}$ m²s⁻¹.

Further, the hydrate saturation $S_h$ and the formation factor F are calculated by the theoretical models for the hydrate saturation and the formation factor proposed in the present application.

Finally, for Y=1 in the non-grain-contact occurrence mode, the permeability of the hydrate-bearing sediment is calculated by:

$$K = \frac{\tau_p(S_h=0)D_i}{4m^2[F(1-S_h)^{-n}-1]^2 F}(1-S_h)^{3n}$$

$$K = \frac{\tau_c(S_h=0)D_i}{4m^2[F(1-S_h)^{-n}-1]^2 F}(1-S_h)^{3n}$$

$$K = \frac{\tau_D(S_h=0)D_i}{4m^2[F(1-S_h)^{-n}-1]^2 F}(1-S_h)^{3n}$$

for $Y=Y_f(f)$ in the grain-contact occurrence mode, the permeability of the hydrate-bearing sediment is calculated by:

$$K = \frac{\tau_p(S_h=0)D_i}{4m^2[F(1-S_h)^{-n}-1]^2 F}(1-S_h)^{3n}Y_f(f)$$

$$K = \frac{\tau_c(S_h=0)D_i}{4m^2[F(1-S_h)^{-n}-1]^2 F}(1-S_h)^{3n}Y_f(f)$$

$$K = \frac{\tau_D(S_h=0)D_i}{4m^2[F(1-S_h)^{-n}-1]^2 F}(1-S_h)^{3n}Y_f(f)$$

Figure 11:
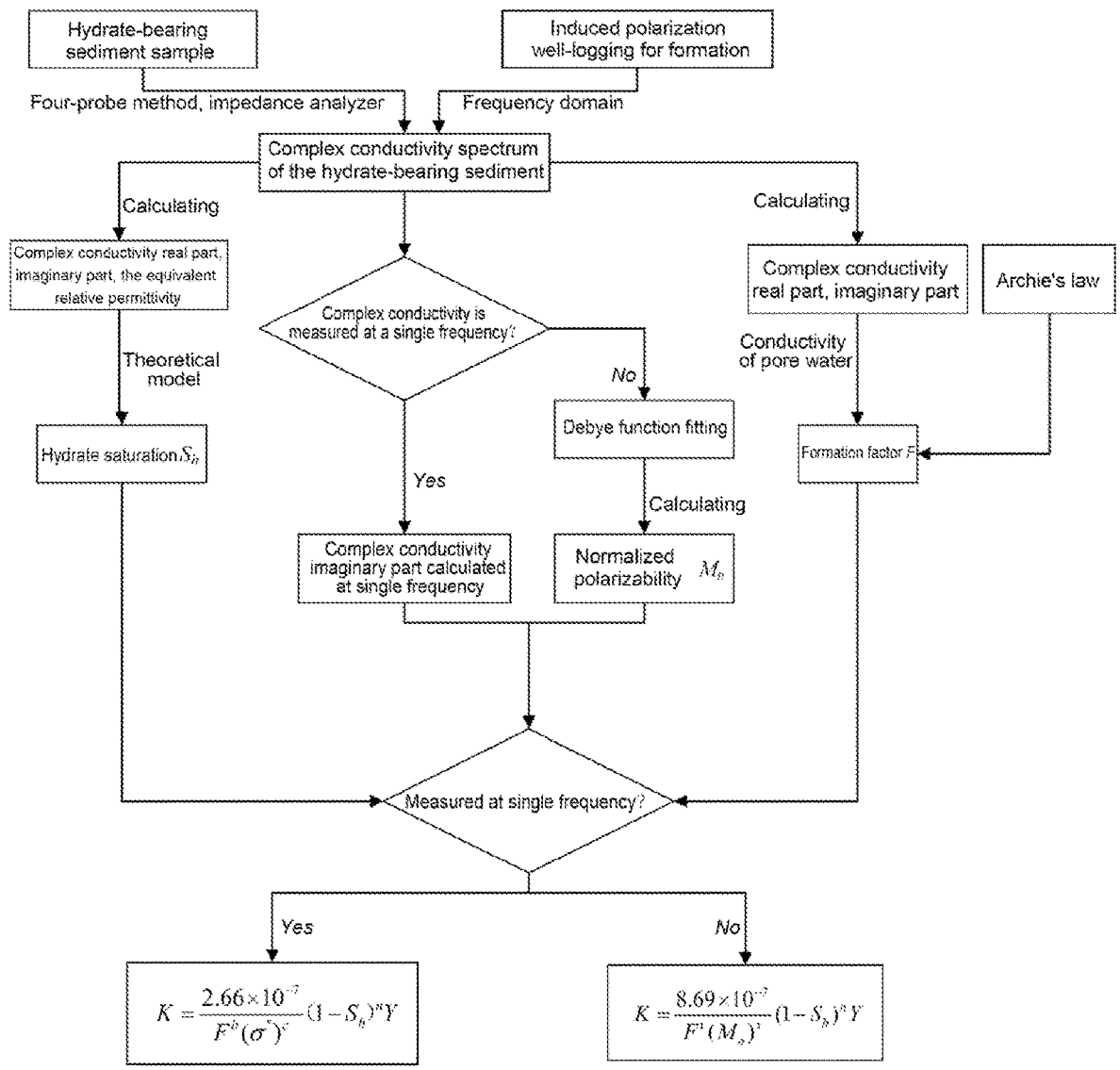
FIG. 11 is a flowchart of a method for calculating permeability of hydrate-bearing sediment based on polarization amplitude, hydrate saturation, occurrence mode correction factor and formation factor according to one embodiment.

(2) The permeability of the hydrate-bearing sediment is calculated based on the polarization amplitude (including the complex conductivity imaginary part and the normalized polarizability) in combination with the hydrate saturation, the occurrence mode correction factor and the formation factor, as shown in FIG. 11. First, if the complex conductivity of the hydrate-bearing sediment is measured at a single frequency (for example f=0.01 Hz, 0.1 Hz, 1 Hz, 10 Hz, 100 Hz, and 1,000 Hz), the complex conductivity imaginary part at this single frequency is calculated from the complex conductivity.

Further, the hydrate saturation $S_h$ and the formation factor F are calculated by the theoretical models for the hydrate saturation and the formation factor proposed in the method of the present application.

Further, by the method proposed in the present application, the obtained permeability of the hydrate-bearing sediment is $$K = \frac{2.66\times10^{-7}}{F^b(\sigma'')^c}(1-S_h)^n$$

for Y=1 in the non-grain-contact occurrence mode, and $$K = \frac{2.66\times10^{-7}}{F^b(\sigma'')^c}(1-S_h)^n Y_f(f)$$

for $Y=Y_f(f)$ in the grain-contact occurrence mode, where b and c are constants, which can be obtained by fitting experimental data for the hydrate-bearing sediment sample, and which can be obtained by fitting well-logging data for the formation hydrate-bearing sediment. In this embodiment, b=5.35, and c=0.66; and n is a saturation index, n=1.69.

Second, if the complex conductivity spectrum of the hydrate-bearing sediment are measured at multiple frequencies, the complex conductivity spectrum is fitted by using the Debye decomposition model $$\sigma^*(\omega) = \frac{\sigma_0}{\left[1 - \sum_{i=1}^{j} m_i \times \left(1 - \frac{1}{1+i\omega\tau_i}\right)\right]},$$

the parameters $\sigma_0$, $m_i$ and $\tau_i$ in the Debye decomposition model are obtained (e.g., by genetic algorithm, and simulated annealing algorithm), so as to obtain the first normalized polarizability $$M_n = \sum_{i=1}^{j} m_i \sigma_0$$

based on the Debye model.

Further, the hydrate saturation $S_h$ and the formation factor F are calculated by the theoretical models for the hydrate saturation and formation factor proposed in the method of the present application.

By the method proposed in the present application, the obtained permeability of the hydrate-bearing sediment is $$K = \frac{8.69\times10^{-7}}{F^r(M_n)^x}(1-S_h)^n$$

for Y=1 in the non-grain-contact occurrence mode, and $$K = \frac{8.69 \times 10^{-7}}{F^r (M_n)^x} (1-S_h)^n Y_I(f)$$

for Y=$Y_I(f)$ in the grain-contact occurrence mode, where r and x are constants, which can be obtained by fitting experimental data for the hydrate-bearing sediment sample and which can be obtained by fitting well-logging data for the formation hydrate-bearing sediment. In this embodiment, r=5.38, and x=0.79; and n is the saturation index, n=1.69.

Figure 12:
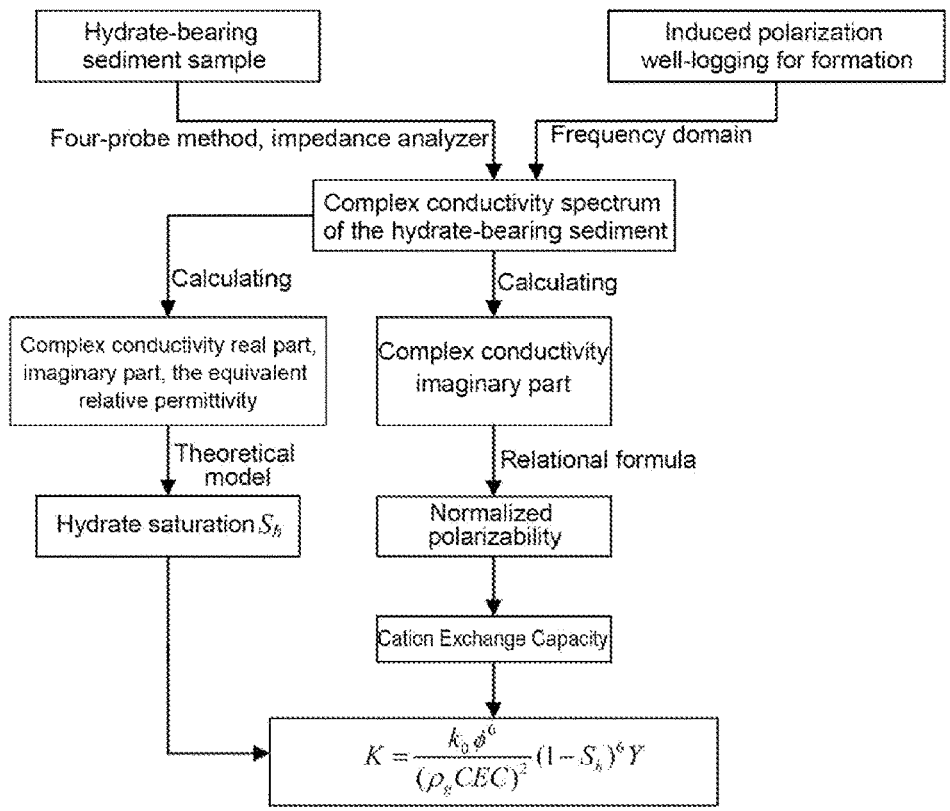
FIG. 12 is a flowchart of a method for calculating permeability of hydrate-bearing sediment based on Cation Exchange Capacity, hydrate saturation and occurrence mode correction factor according to one embodiment.
Figure 13:
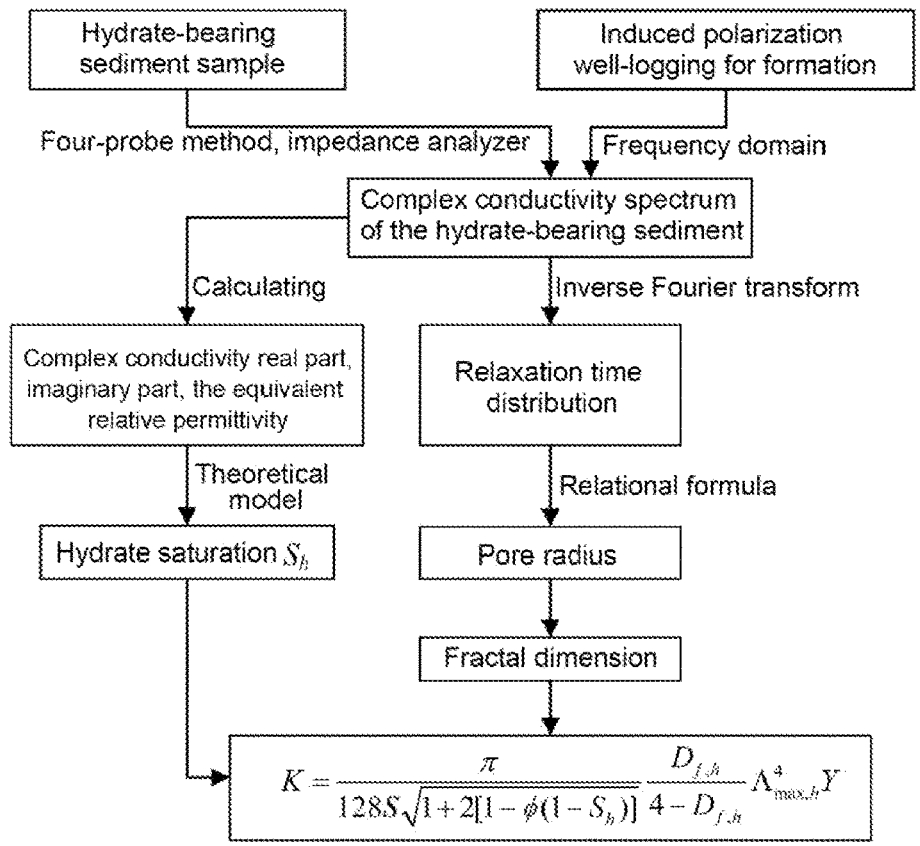
FIG. 13 is a flowchart of a method for calculating permeability of hydrate-bearing sediment based on pore radius, fractal dimension, hydrate saturation and occurrence mode correction factor according to one embodiment.

(3) The permeability of the hydrate-bearing sediment is calculated based on the CEC in combination with the hydrate saturation and the occurrence mode correction factor, as shown in FIG. 12. The complex conductivity imaginary part at different frequencies is calculated from the complex conductivity spectrum of the hydrate-bearing sediment and the second normalized polarizability is calculated by $$M_n(f_1, f_2) = \frac{2\sigma''_{f_1 f_2}(\ln A)}{\pi},$$

where a denotes the complex conductivity imaginary part corresponding to the geometric mean of the frequencies $f_1$ and $f_2$; A denotes the quotient of the frequency $f_2$ and the frequency $f_1$. For example, when $f_1$=10 and $f_2$=1000, then A=$10^2$.

Further, the hydrate saturation $S_h$ is calculated by the theoretical model for the hydrate saturation proposed in the method of the present application.

Further, the obtained CEC is $$CEC = \frac{M_n}{(1-S_h)^{m-1} \rho_g \lambda \phi^{m-1}},$$

where m denotes the cementation index, m=1.495; $\rho_g$ denotes the particle density, which is generally 2650 kg/m³; $\lambda$ denotes the mobility of counterions during polarization, $\lambda$=3.0±0.7×10⁻¹⁰ m²s⁻¹V⁻¹; $\phi$ denotes the porosity, which may be obtained by experimental tests for the hydrate-bearing sediment sample and which may be obtained by field tests or inversion calculation of the complex conductivity spectrum for the formation hydrate-bearing sediment, where the porosity is inversely calculated from the complex conductivity spectrum by obtaining the formation factor F by $$F = \frac{\sigma_w}{\sigma' - \sigma''/l}$$

and then calculating the porosity based on Archie's first law.

Finally, the obtained permeability of hydrate-bearing sediment is $$K = \frac{k_0 \phi^6}{(\rho_g CEC)^2} (1-S_h)^6$$

for Y=1 in the non-grain-contact occurrence mode and $$K = \frac{k_0 \phi^6}{(\rho_g CEC)^2} (1-S_h)^6 Y_I(f)$$

for Y $Y_1$( ) in the grain-contact occurrence mode, and $k_o$ is a constant, $k_0 = 10^{4.3}$.

(4) When the permeability of the hydrate-bearing sediment is calculated based on the pore radius and the fractal dimension in combination with the hydrate saturation, and the occurrence mode correction factor, the complex conductivity spectrum of the hydrate-bearing sediment is fitted, and the relaxation time distribution is obtained by Fourier inversion, and further obtain the pore radius $\Delta_{max,h}$, $\Delta_{max,0}$, and $\Delta_{min,0}$, respectively.

The complex conductivity may be expressed as:

$$\sigma^* = \sigma_\infty - M_n \int_0^\infty \frac{g(\tau)}{1+i\omega\tau} d\tau + i\omega\varepsilon_\infty,$$

where $\sigma_\infty$ is the instantaneous conductivity, $M_n$ is the first normalized polarizability, $g(\tau)$ denotes the relaxation time distribution, r is the relaxation time, and $\varepsilon_\infty$ denotes the permittivity of the hydrate-bearing sediment at frequency for Maxwell-Wagner polarization.

As for the separated complex conductivity imaginary part, given $$z = -\ln(\omega) \Leftrightarrow \omega = e^{-z}$$
$$s = \ln(\tau) \Leftrightarrow \tau = e^s \quad ;$$
$$G(s) = \tau g(\tau)$$

then $\sigma''_z(z) = -\int_{-\infty}^{+\infty} G(s) \frac{1}{2\cosh(z-s)} ds;$

Fourier transform is performed on this formula, and inverse Fourier transform is performed on G(s) to obtain $$G(s) = -\frac{2}{\pi} FT^{-1} [\tilde{\sigma}''_\eta(\eta) \cosh(\pi^2 \eta)].$$

The symbol '~' indicates the Fourier transform result, η denotes the frequency of Fourier space, and $FT^{-1}$ denotes the inverse Fourier transform operation.

The relaxation time distribution $g(\tau)$ can be calculated based on the relation between G(s) and g(f). The maximum pore radius $\Delta_{max,h}$ when the hydrate saturation is not 0, the maximum pore radius $\Delta_{max,0}$ when the hydrate saturation is 0, and the minimum pore radius $\Delta_{min,0}$ when the hydrate saturation is 0 are calculated by $$\tau = \frac{\Lambda^2}{2D_i}.$$

If the hydrate-bearing sediment contains only quartz sand particles, water, and hydrate, $D_i$=1.32×10⁹ m²s⁻¹; if the hydrate-bearing sediment sample also contains clay minerals, $D_i$=3.8×10⁻¹² m²s⁻¹.

When the hydrate saturation is 0, the fractal dimension is calculated by:

$$D_{f,0} = 2 - \frac{\ln\phi}{\ln\left(\frac{\Lambda_{min,0}}{\Lambda_{max,0}}\right)},$$

$\phi$ denotes the porosity, which can be obtained by experimental tests for the hydrate-bearing sediment sample and which can be obtained by field tests or inversion calculation of the complex conductivity spectrum for the formation hydrate-bearing sediment, where the porosity is inversely calculated from the complex conductivity spectrum by obtaining the formation factor F by $$F = \frac{\sigma_w}{\sigma' - \sigma''/l}$$

and then calculating the porosity based on Archie's first law.

Further, the hydrate saturation $S_h$ is calculated by the theoretical model for the hydrate saturation provided in the present application.

Further, when the hydrate saturation is not 0, the fractal dimension is calculated by:

$$D_{f,h} = D_{f,0} - \frac{\ln(1 - S_h)}{\ln\phi}(2 - D_{f,0});$$

Further, the obtained permeability of the hydrate-bearing sediment is $$K = \frac{\pi}{128S\sqrt{1 + 2[1 - \phi(1 - S_h)]}} \frac{D_{f,h}}{4 - D_{f,h}} \Lambda_{max,h}^4$$

for Y=1 in the non-grain-contact occurrence mode, and $$K = \frac{\pi}{128S\sqrt{1 + 2[1 - \phi(1 - S_h)]}} \frac{D_{f,h}}{4 - D_{f,h}} \Lambda_{max,h}^4 Y_I(f)$$

for Y=Y$_I$(f) in the grain-contact occurrence mode. For the hydrate-bearing sediment sample, S denotes the cross-sectional area of the sample (for example, when the sample is cylindrical, S denotes the area of a circular cross section), which is obtained by experiment tests. For the formation hydrate-bearing sediment, S denotes the equivalent cross-sectional area of the formation sediment, which is obtained by detection performance specifications (such as the factor of the well-logging instrument) of the well-logging instrument.

In the method of the present application, for the hydrate-bearing sediment sample, it can be obtained by laboratory-made or by field sampling; low-frequency impedance spectrum measurement is performed on the sample, and complex conductivity spectrum can be obtained by conversion; for the formation hydrate-bearing sediment, based on the induced polarization well-logging method, supplying AC to the current electrodes in the well by using the ground equipment, the complex conductivity spectrum is obtained by changing the frequency f of the AC.

The characteristic parameters of the complex conductivity are calculated based on the complex conductivity spectrum, and then the hydrate saturation, the occurrence mode correction factor and the formation factor are calculated. The four methods for calculating the permeability of the hydrate-bearing sediment are adopted for permeability evaluation of the hydrate-bearing sediment, which allow a large measuring range, low cost and high accuracy, and can accurately obtain the permeability of hydrate-bearing sediment and effectively reflect the micro-pore structure of hydrate-bearing sediment.

The embodiments are merely a description of the preferred embodiments of the present application, rather than a limitation on the scope of the present application. Without departing from the design spirit of the present application, various modifications and improvements made by those of ordinary skill in the art to the technical solution of the present application shall all fall into the scope of protection defined by the claims of the present application.

The invention claimed is:

1. A non-transferrable computer readable storage medium storing computer instructions which are executable by a processor, wherein the computer instructions are configured to enable a computer to execute following steps of a permeability evaluation method for hydrate-bearing sediment:

a complex conductivity spectrum obtaining step of obtaining complex conductivity spectrum of the hydrate-bearing sediment;

a hydrate saturation calculating step of calculating hydrate saturation $S_h$ from a frequency spectrum of a complex conductivity real part, from a complex conductivity imaginary part, or from equivalent relative permittivity; wherein the frequency spectrum of the complex conductivity real part, the complex conductivity imaginary part, and the equivalent relative permittivity are calculated from the complex conductivity spectrum;

a formation factor calculating step of when the hydrate-bearing sediment contains only three media of water, hydrate and quartz sand particles, calculating the formation factor based on Archie's first law; when the hydrate-bearing sediment contains not only the three media of the water, the hydrate and the quartz sand particles, but also clay mineral particles, calculating the formation factor from the complex conductivity real part, the complex conductivity imaginary part and a conductivity of pore water; and, a permeability calculating step of when the hydrate-bearing sediment contains only the water, the hydrate, and the quartz sand particles, calculating the permeability of the hydrate-bearing sediment based on relaxation time in combination with the hydrate saturation and the formation factor, or based on polarization amplitude in combination with the hydrate saturation and the formation factor; when the hydrate-bearing sediment contains the water, the hydrate, the quartz sand particles, and the clay mineral particles, calculating the permeability of the hydrate-bearing sediment based on the relaxation time in combination with the hydrate saturation and the formation factor, or based on the polarization amplitude in combination with the hydrate saturation and the formation factor, or based on Cation Exchange Capacity in combination with the hydrate saturation; and when porous medium in the hydrate-bearing sediment has fractal characteristics and pore size satisfies a fractal scaling relation, calculating the permeability of the hydrate-bearing sediment based on pore radius and fractal dimension in combination with the hydrate saturation.

2. The non-transferrable computer readable storage medium according to claim 1, wherein, the permeability evaluation method further includes an occurrence mode correction factor Y calculating step; Y=1 when the hydrate is in a non-grain-contact occurrence mode, and Y=Y$_f$(f) when the hydrate is in a grain-contact occurrence mode;

$$Y_I(f) = \frac{\sigma''_{nt}(f)}{\sigma''_t(f)} \tag{5}$$

where Y$_f$(f) denotes an occurrence mode correction factor at a frequency f in the grain-contact occurrence mode of the hydrate; σ"$_{nt}$(f) denotes a complex conductivity imaginary part at the frequency f in the non-grain-contact occurrence mode; and σ"$_t$(f) denotes a complex conductivity imaginary part at the frequency f in the grain-contact occurrence mode; and, in the permeability calculating step, when the hydrate-bearing sediment contains only the water, the hydrate and the quartz sand particles, calculating the permeability of the hydrate-bearing sediment based on the relaxation time in combination with the hydrate saturation, the occurrence mode correction factor and the formation factor, or based on the polarization amplitude in combination with the hydrate saturation, the occurrence mode correction factor and the formation factor; when the hydrate-bearing sediment contains the water, the hydrate, the quartz sand particles, and the clay mineral particles, calculating the permeability of the hydrate-bearing sediment based on the relaxation time in combination with the hydrate saturation, the occurrence mode correction factor and the formation factor, or based on the polarization amplitude in combination with the hydrate saturation, the occurrence mode correction factor and the formation factor, or based on the Cation Exchange Capacity in combination with the hydrate saturation and the occurrence mode correction factor; when the porous medium in the hydrate-bearing sediment has the fractal characteristics and the pore size satisfies the fractal scaling relation, calculating the permeability of the hydrate-bearing sediment based on the pore radius and the fractal dimension in combination with the hydrate saturation and the occurrence mode correction factor.

3. The non-transferrable computer readable storage medium according to claim 2, wherein, the hydrate-bearing sediment includes hydrate-bearing sediment sample and formation hydrate-bearing sediment; in the complex conductivity spectrum obtaining step, for the hydrate-bearing sediment sample, impedance spectrum measurement is performed on the sample and an electrical impedance spectrum is obtained; using a relationship between electrical impedance and complex resistivity, combining with a length and cross-sectional area of the sample, and based on a definition of complex conductivity, the complex conductivity spectrum is obtained through conversion; and for the formation hydrate-bearing sediment, based on an induced polarization well-logging method, supplying AC to current electrodes in a well by using ground equipment, the complex conductivity spectrum is obtained by changing frequency f of the AC.

4. The non-transferrable computer readable storage medium according to claim 3, wherein, in the complex conductivity spectrum obtaining step, for the hydrate-bearing sediment sample, the impedance spectrum measurement is performed by a four-probe method, including following specific steps of putting the hydrate-bearing sediment sample in a sample holder, installing a pair of current electrodes and a pair of potential electrodes at both ends of the sample holder, connecting the four electrodes to an impedance analyzer, and measuring the electrical impedance spectrum of the hydrate-bearing sediment sample by the impedance analyzer; and for the formation hydrate-bearing sediment, the complex conductivity spectrum is obtained by the induced polarization well-logging method, specifically including following steps of connecting the ground equipment to the current electrodes and the potential electrodes in the well in the field, supplying AC to the current electrodes in the well to generate an electric field in the well, and constantly changing the frequency of AC with rang from 1 mHz to 10 kHz, so as to obtain the complex conductivities at different frequencies and then obtain the complex conductivity spectrum.

5. The non-transferrable computer readable storage medium according to claim 3, wherein, using the relationship between the electrical impedance and the complex resistivity, and combining with the length and the cross-sectional area of the sample, the complex conductivity is calculated by Formula (1) based on the definition of complex conductivity, and the complex conductivity spectrum is further obtained;

$$\sigma^* = \frac{1}{\rho^*} = \frac{1}{K_g Z^*} \tag{1}$$

where σ* is the complex conductivity, ρ* is the complex resistivity, Z* is the measured electrical impedance, K$_g$ is geometrical factor of the sample, K$_g$=S/L, where S is the cross-sectional area of the sample, and L is the length of the sample;

the hydrate-bearing sediment sample is a laboratory-made sample or a sample obtained by field sampling.

6. The non-transferrable computer readable storage medium according to claim 2, wherein, in the hydrate saturation calculating step, the complex conductivity is a function of an angular frequency a), expressed as:

$$\sigma^*(\omega) = \sigma'(\omega) + i\sigma''(\omega) \tag{2}$$

where, σ* is the complex conductivity, σ' is the complex conductivity real part, σ" is the complex conductivity imaginary part, and ω is the angular frequency, related to the frequency f as c=2πf;

the hydrate saturation S$_h$ is calculated from the frequency spectrum of the complex conductivity real part σ':

in the frequency f range of 1 mHz to 10 Hz, the hydrate saturation S$_h$ is calculated by the formula σ'=3.59(1−S$_h$)$^{1.30}$;

in the frequency f range of 500 Hz to 100 kHz, the hydrate saturation S$_h$ is calculated by the formula σ'=4.06(1−S$_h$)$^{1.34}$;

the hydrate saturation S$_h$ is calculated from the complex conductivity imaginary part σ":

at the frequency f of 1 mHz, the hydrate saturation S$_h$ is calculated by σ"=1.88×10$^{-5}$(1-S$_h$)$^{2.94}$;

at the frequency f of 0.1 Hz, the hydrate saturation S$_h$ is calculated by σ"=1.88×10$^{-3}$(1-S$_h$)$^{2.94}$;

at the frequency f of 100 Hz, the hydrate saturation S$_h$ is calculated by σ"=1.09×10$^{-1}$(1-S$_h$)$^{-0.42}$;

at the frequency f of 1 kHz, the hydrate saturation S$_h$ is calculated by σ"=1.28×10$^{-2}$(1-S$_h$)$^{-0.91}$;

the hydrate saturation $S_h$ is calculated from the equivalent relative permittivity $\varepsilon_{eff}$, at the frequency f of 1 mHz, the hydrate saturation $S_h$ is calculated by $\varepsilon_{eff}=3.37\times10^5(1-S_h)^{2.94}$;

at the frequency f of 100 Hz, the hydrate saturation $S_h$ is calculated by $\varepsilon_{eff}=1.96\times10^4(1-S_h)^{-0.42}$;

at the frequency f of 1 kHz, the hydrate saturation $S_h$ is calculated by $\varepsilon_{eff}=2.30\times10^2(1-S_h)^{-0.91}$.

7. The non-transferrable computer readable storage medium according to claim 6, wherein, in the formation factor calculating step, the formation factor is calculated by Archie's first law by Formula (6):

$$F=\phi^{-m} \quad (6)$$

where F is the formation factor; $\phi$ is porosity of the hydrate-bearing sediment, obtained by experimental tests for a hydrate-bearing sediment sample, and obtained by field tests or inversion calculation of the complex conductivity spectrum for a formation hydrate-bearing sediment; m denotes a cementation index, and m=1.495;

the formation factor is calculated by using the complex conductivity real part, complex conductivity imaginary part and the conductivity of the pore water by Formula (7):

$$F = \frac{\sigma_w}{\sigma' - \sigma''/I} \quad (7)$$

where $\sigma_w$ is the conductivity of the pore water, obtained by the experimental tests for the hydrate-bearing sediment sample and obtained by the field tests for the formation hydrate-bearing sediment; and I is a ratio of polarization intensity to surface conduction intensity in pore space, I is dimensionless and I=0.042.

8. The non-transferrable computer readable storage medium according to claim 7, wherein, in the permeability calculating step, the permeability of the hydrate-bearing sediment is calculated based on the relaxation time in combination with the hydrate saturation, the occurrence mode correction factor, and the formation factor, including specific steps as follows:

when the pore size serves as a scale, for Y=1 in the non-grain-contact occurrence mode, the permeability of the hydrate-bearing sediment is:

$$K = \frac{\tau(S_h = 0)D_i}{4F}(1 - S_h)^{3n} \quad (8.1)$$

for $Y=Y_f(f)$ in the grain-contact occurrence mode, the permeability of the hydrate-bearing sediment is:

$$K = \frac{\tau(S_h = 0)D_i}{4F}(1 - S_h)^{3n}Y_I(f) \quad (8.2)$$

where $\tau(S_h=0)$ denotes a relaxation time when the hydrate saturation is $$0; D_i = \frac{K_b T \beta_{(+)}^S}{|q_+|}$$

denotes a diffusion coefficient of counterions with unit of $m^2/s$; $K_b$ denotes Boltzmann constant, being $1.3807\times10^{-23}JK^{-1}$; T denotes an absolute temperature with unit of Kelvin; $|q_+|$ denotes an absolute value of counterions charge in Stem layer, being $1.6\times10^{-19}C$; $\beta_{(+)}^S$ denotes an ion mobility in the Stem layer; when the hydrate-bearing sediment contains only the quartz sand particles, the water and the hydrate, $\beta_{(+)}^S=5.19\times10^{-8}$ $m^2s^{-1}V^{-1}$, $D_i=1.32\times10^{-9}$ $m^2s^{-1}$, and when the hydrate-bearing sediment contains the quartz sand particles, the water, the hydrate and the clay mineral particles, $\beta_{(+)}^S=1.5\times10^{-10}$ $m^2s^{-1}V^{-1}$, $D_i=3.8\times10^{-12}$ $m^2s^{-1}$; and n is a saturation index, n=1.69;

when an average diameter of spherical particles serves as a scale, for Y=1 in the non-grain-contact occurrence mode, the permeability of the hydrate-bearing sediment is:

$$K = \frac{\tau(S_h = 0)D_i}{4m^2[F(1-S_h)^{-n}-1]^2 F}(1-S_h)^{3n} \quad (9.1)$$

for $Y=Y_f(f)$ in the grain-contact occurrence mode, the permeability of the hydrate-bearing sediment is:

$$K = \frac{\tau(S_h = 0)D_i}{4m^2[F(1-S_h)^{-n}-1]^2 F}(1-S_h)^{3n}Y_I(f) \quad (9.2)$$

where m denotes the cementation index, m=1.495;

the relaxation time $\tau(S_h=0)$ is obtained through analysis of a frequency spectrum of the complex conductivity imaginary part at the hydrate saturation of 0.

9. The non-transferrable computer readable storage medium according to claim 7, wherein, in the permeability calculating step, the permeability of the hydrate-bearing sediment is calculated based on the polarization amplitude in combination with the hydrate saturation, the occurrence mode correction factor, and the formation factor, including specific steps as follows:

when the complex conductivity of the hydrate-bearing sediment is measured at a single frequency f, the complex conductivity imaginary part at the single frequency is calculated from the complex conductivity; and based on a relationship between the complex conductivity imaginary part and the permeability at the single frequency, for Y=1 in the non-grain-contact occurrence mode, the permeability of the hydrate-bearing sediment is:

$$K = \frac{2.66\times10^{-7}}{F^b(\sigma'')^c}(1-S_h)^n \quad (10.1)$$

for $Y=Y_f(f)$ in the grain-contact occurrence mode, the permeability of the hydrate-bearing sediment is:

$$K = \frac{2.66\times10^{-7}}{F^b(\sigma'')^c}(1-S_h)^n Y_I(f) \quad (10.2)$$

where b and c are constants, obtained by fitting experimental data for the hydrate-bearing sediment sample, and obtained by fitting well-logging data for the formation hydrate-bearing sediment;

when the complex conductivity spectrum of the hydrate-bearing sediment is measured at multiple different frequencies f, the complex conductivity spectrum is fitted by using a Debye decomposition model, obtaining parameters in the Debye decomposition model, and further a first normalized polarizability $M_n$ based on the Debye decomposition model is obtained:

$$M_n = \sum_{i=1}^{j} m_i \sigma_0 \tag{11}$$

where $\sigma_0$ and $m_i$ are the parameters in the Debye decomposition model, and j indicates that there are j pairs of relaxation time and polarizability;

further:
for Y=1 in the non-grain-contact occurrence mode, the permeability of the hydrate-bearing sediment is:

$$K = \frac{8.69 \times 10^{-7}}{F^r (M_n)^x} (1 - S_h)^n \tag{12.1}$$

for $Y=Y_f(f)$ in the grain-contact occurrence mode, the permeability of the hydrate-bearing sediment is:

$$K = \frac{8.69 \times 10^{-7}}{F^r (M_n)^x} (1 - S_h)^n Y_f(f) \tag{12.2}$$

where r and x are constants, obtained by fitting experimental data for the hydrate-bearing sediment sample and obtained by fitting well-logging data for the formation hydrate-bearing sediment.

10. The non-transferrable computer readable storage medium according to claim 7, wherein, in the permeability calculating step, the permeability of the hydrate-bearing sediment is calculated based on the Cation Exchange Capacity in combination with the hydrate saturation, and the occurrence mode correction factor, including specific steps as follows:
the complex conductivity imaginary part at different frequencies is calculated from the complex conductivity spectrum of the hydrate-bearing sediment, and thus a second normalized polarizability $M_n(f_1, f_2)$ is obtained as follows:

$$M_n(f_1, f_2) = -\frac{2\sigma''_{f_1 f_2}(\ln A)}{\pi} \tag{13}$$

where $\sigma''_{f_1 f_2}$ is the complex conductivity imaginary part corresponding to a geometric mean of the frequencies $f_1$ and $f_2$, and A denotes a quotient of the frequency $f_2$ and the frequency $f_1$; relatively, $f_2$ is a high frequency and $f_1$ is a low frequency;
the Cation Exchange Capacity is obtained by the second normalized polarizability $M_n(f_1, f_2)$ as follows:

$$CEC = \frac{M_n(f_1, f_2)}{(1 - S_h)^{m-1} \rho_g \lambda \phi^{m-1}} \tag{14}$$

where the CEC denotes cation exchange capacity with unit of C/kg; $\rho_g$ denotes a particle density, $\rho_g=2650$ kg m$^3$; and $\lambda$ denotes a mobility of counterions during polarization, $\lambda=3.0+0.7\times10^{-10}$ m$^2$s$^{-1}$V$^{-1}$;
according to the Cation Exchange Capacity:
for Y=1 in the non-grain-contact occurrence mode, the permeability of the hydrate-bearing sediment is:

$$K = \frac{k_0 \phi^6}{(\rho_g CEC)^2} (1 - S_h)^6 \tag{15.1}$$

for $Y=Y_f(f)$ in the grain-contact occurrence mode, the permeability of the hydrate-bearing sediment is:

$$K = \frac{k_0 \phi^6}{(\rho_g CEC)^2} (1 - S_h)^6 Y_f(f) \tag{15.2}$$

where $k_0$ is a constant and $k_0=10^{4.3}$.

11. The non-transferrable computer readable storage medium according to claim 7, wherein, in the permeability calculating step, the permeability of the hydrate-bearing sediment is calculated based on the pore radius and the fractal dimension in combination with the hydrate saturation and the occurrence mode correction factor, including specific steps as follows:
the pore radius is firstly inversely calculated by Fourier transform, to obtain $\Delta_{max,h}$, $\Delta_{max,0}$ and $\Delta_{min,0}$; specifically,
the complex conductivity of the hydrate-bearing sediment is expressed by Formula (16), $$\sigma^* = \sigma_\infty - M_n \int_0^\infty \frac{g(\tau)}{1 + i\omega\tau} d\tau + i\omega\varepsilon_\infty \tag{16}$$

where $\sigma_\infty$ is instantaneous conductivity, $M_n$ is a first normalized polarizability, $g(\tau)$ denotes relaxation time distribution, z is the relaxation time, and $\varepsilon_\infty$ denotes a permittivity of the hydrate-bearing sediment at frequency for Maxwell-Wagner polarization;
the complex conductivity imaginary part is separated from the complex conductivity, given:

$$z = -\ln(\omega) \Leftrightarrow \omega = e^{-z} \tag{17}$$

$$s = \ln(\tau) \Leftrightarrow \tau = e^s$$

$$G(s) = \tau g(\tau)$$

then:

$$\sigma''_z(z) = -\int_{-\infty}^{+\infty} G(s) \frac{1}{2\cosh(z-s)} ds \tag{18}$$

Fourier transform is performed on Formula (18), and inverse Fourier transform is performed on G(s) to obtain:

$$G(s) = -\frac{2}{\pi} FT^{-1} [\tilde{\sigma}''_\eta(\eta) \cosh(\pi^2 \eta)] \tag{19}$$

where $FT^{-1}$ denotes the inverse Fourier transform operation, the symbol '~' denotes a Fourier transform result, and r/denotes a frequency of Fourier space;

the relaxation time distribution $g(\tau)$ is calculated based on the relation between $G(\tau)$ and $g(\tau)$; by using $$\tau = \frac{\Lambda^2}{2D_i},$$

the maximum pore radius $\Delta_{max,h}$ when the hydrate saturation is not 0, the maximum pore radius $\Delta_{max,0}$ when the hydrate saturation is 0, and the minimum pore radius $\Delta_{min,0}$ when the hydrate saturation is 0, are calculated;

further, a fractal dimension $D_{f,0}$ when the hydrate saturation is 0 is calculated, $$D_{f,0} = 2 - \frac{\ln\phi}{\ln\left(\frac{\Lambda_{min,0}}{\Lambda_{max,0}}\right)} \tag{20}$$

further, a fractal dimension $D_{f,h}$ when the hydrate saturation is not 0 is calculated, $$D_{f,h} = D_{f,0} - \frac{\ln(l - S_h)}{\ln\phi}(2 - D_{f,0}) \tag{21}$$

further, for $Y=1$ in the non-grain-contact occurrence mode, the permeability of the hydrate-bearing sediment is:

$$K = \frac{\pi}{128\tau_h S} \frac{D_{f,h}}{4 - D_{f,h}} \Lambda_{max,h}^4 \tag{22.1}$$

for $Y=Y_f(f)$ in the grain-contact occurrence mode, the permeability of the hydrate-bearing sediment is:

$$K = \frac{\pi}{128\tau_h S} \frac{D_{f,h}}{4 - D_{f,h}} \Lambda_{max,h}^4 Y_I(f) \tag{22.2}$$

where $T_h$ denotes tortuosity at different hydrate contents, and $\tau_h = \sqrt{1+2[1-\phi(1-S_h)]}$; for the hydrate-bearing sediment sample, S denotes a cross-sectional area of the sample, obtained by experimental tests; for the formation hydrate-bearing sediment, S denotes an equivalent cross-sectional area of the formation sediment, obtained by detection performance specifications of well-logging instrument.

\* \* \* \* \*